US007203135B2

(12) United States Patent
Kano et al.

(10) Patent No.: US 7,203,135 B2
(45) Date of Patent: Apr. 10, 2007

(54) DISK ARRAY SYSTEM AND METHOD FOR CONTROLLING DISK ARRAY SYSTEM

(75) Inventors: Azuma Kano, Odawara (JP); Takuji Ogawa, Odawara (JP); Ikuya Yagisawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 11/024,644

(22) Filed: Dec. 30, 2004

(65) Prior Publication Data

US 2005/0154942 A1 Jul. 14, 2005

Related U.S. Application Data

(63) Continuation of application No. 10/766,015, filed on Jan. 29, 2004, now Pat. No. 7,057,981.

(30) Foreign Application Priority Data

Nov. 28, 2003 (JP) ............................. 2003-400517

(51) Int. Cl.
*G11B 17/22* (2006.01)
*G06F 11/00* (2006.01)

(52) U.S. Cl. ............................. 369/30.28; 369/30.38; 369/30.58; 714/6; 714/43; 711/114

(58) Field of Classification Search ............ 369/30.27, 369/30.58, 30.28, 30.29, 30.38, 30.06, 30.4, 369/30.41, 30.43, 34.01, 30.46, 30.09; 714/43, 714/6; 709/214; 711/114, 162, 11, 111; 710/11, 316

See application file for complete search history.

(56) References Cited

U.S. PATENT DOCUMENTS 5,423,046 A 6/1995 Nunnelley et al.

(Continued)

FOREIGN PATENT DOCUMENTS

EP 0795824 9/1997

(Continued)

OTHER PUBLICATIONS

SGI InfiniteStorage TP9300S Storage Array, Data Sheet, 2 pp., available at: http://www.sgi.com/pdfs/3643.pdf.

(Continued)

*Primary Examiner*—Ali Neyzari
(74) *Attorney, Agent, or Firm*—Mattingly, Stanger, Malur & Brundidge, P.C.

(57) ABSTRACT

A disk array system having first and second housings and a controller for controlling the first and second housings. Fiber channel hard disk drives are received in the first housing, and serial ATA hard disk drives are received in the second housing. When reading data stored in a serial ATA hard disk drive in the second housing, the controller reads a plurality of pieces of data including the data to be read and parity data for the plurality of pieces of data from all the hard disk drives of an RAID group to which the hard disk drive storing the data to be read belongs. Thus, the controller examines whether the plurality of pieces of data including the data to be read are written in the hard disk drives with erroneous contents or not.

23 Claims, 19 Drawing Sheets

U.S. PATENT DOCUMENTS

| | | |
|---|---|---|
| 5,475,814 A | 12/1995 | Tomimitsu |
| 5,546,558 A | 8/1996 | Jacobson et al. |
| 5,603,003 A | 2/1997 | Akizawa et al. |
| 5,805,788 A | 9/1998 | Johnson |
| 5,812,754 A | 9/1998 | Lui et al. |
| 5,822,782 A | 10/1998 | Humlicek et al. |
| 5,832,204 A | 11/1998 | Apperley et al. |
| 5,838,891 A | 11/1998 | Mizuno et al. |
| 5,845,319 A | 12/1998 | Yorimitsu |
| 5,848,282 A | 12/1998 | Kang et al. |
| 5,867,736 A | 2/1999 | Jantz |
| 5,884,098 A | 3/1999 | Mason, Jr. |
| 5,951,691 A | 9/1999 | Ng et al. |
| 6,061,750 A | 5/2000 | Beardsley et al. |
| 6,108,748 A | 8/2000 | Ofek et al. |
| 6,115,797 A | 9/2000 | Kanda et al. |
| 6,137,679 A | 10/2000 | Chang |
| 6,154,850 A | 11/2000 | Idleman |
| 6,173,360 B1 | 1/2001 | Beardsley et al. |
| 6,201,692 B1 | 3/2001 | Gamble et al. |
| 6,219,752 B1 | 4/2001 | Sekido |
| 6,219,753 B1 | 4/2001 | Richardson |
| 6,223,249 B1 | 4/2001 | Kato et al. |
| 6,240,486 B1 | 5/2001 | Ofek et al. |
| 6,282,602 B1 | 8/2001 | Blumenau et al. |
| 6,351,375 B1 | 2/2002 | Hsieh et al. |
| 6,400,730 B1 | 6/2002 | Latif |
| 6,449,709 B1 | 9/2002 | Gates |
| 6,484,236 B2 | 11/2002 | Fujimoto et al. |
| 6,484,269 B1 | 11/2002 | Kopylovitz |
| 6,502,108 B1 | 12/2002 | Day, III et al. |
| 6,510,491 B1 | 1/2003 | Franklin et al. |
| 6,549,978 B2 | 4/2003 | Mansur et al. |
| 6,553,408 B1 | 4/2003 | Merrell et al. |
| 6,606,690 B2 | 8/2003 | Padovano |
| 6,628,513 B1 | 9/2003 | Gallagher et al. |
| 6,636,934 B1 | 10/2003 | Linnell |
| 6,640,278 B1 | 10/2003 | Nolan et al. |
| 6,651,137 B2 | 11/2003 | Baek et al. |
| 6,658,592 B1 | 12/2003 | Cohen et al. |
| 6,684,282 B1 | 1/2004 | Kocis |
| 6,684,295 B2 | 1/2004 | Fujimoto et al. |
| 6,708,232 B2 | 3/2004 | Obara et al. |
| 6,728,922 B1 | 4/2004 | Sundaram et al. |
| 6,745,287 B2 | 6/2004 | Fujimoto et al. |
| 6,763,409 B1 | 7/2004 | Elliott |
| 6,763,436 B2 | 7/2004 | Gabber et al. |
| 6,772,287 B2 | 8/2004 | Uchiyama et al. |
| 6,772,365 B1 | 8/2004 | Obara |
| 6,792,486 B1 | 9/2004 | Hanan et al. |
| 6,801,992 B2 | 10/2004 | Gajjar et al. |
| 6,831,839 B2 | 12/2004 | Bovell |
| 6,834,326 B1 | 12/2004 | Wang et al. |
| 2001/0014956 A1 | 8/2001 | Nagata et al. |
| 2001/0019509 A1 | 9/2001 | Aho et al. |
| 2001/0046118 A1 | 11/2001 | Yamanashi et al. |
| 2001/0054136 A1 | 12/2001 | Ninomiya et al. |
| 2001/0056527 A1 | 12/2001 | Ninomiya et al. |
| 2002/0007469 A1 | 1/2002 | Taketa et al. |
| 2002/0019897 A1 | 2/2002 | Cruyningen |
| 2002/0040413 A1 | 4/2002 | Okada et al. |
| 2002/0049886 A1 | 4/2002 | Furuya et al. |
| 2002/0062387 A1 | 5/2002 | Yatziv |
| 2002/0062454 A1 | 5/2002 | Fung |
| 2002/0069317 A1 | 6/2002 | Chow et al. |
| 2002/0069334 A1 | 6/2002 | Hsia et al. |
| 2002/0138705 A1 | 9/2002 | Suzuki et al. |
| 2002/0144048 A1 | 10/2002 | Bolt |
| 2002/0144057 A1 | 10/2002 | Li et al. |
| 2002/0147945 A1 | 10/2002 | Fox et al. |
| 2002/0162048 A1 | 10/2002 | Ackaret et al. |
| 2002/0162057 A1 | 10/2002 | Talagala |
| 2003/0031187 A1 | 2/2003 | Heffernan et al. |
| 2003/0041201 A1 | 2/2003 | Rauscher |
| 2003/0041278 A1 | 2/2003 | Lin |
| 2003/0046460 A1 | 3/2003 | Inoue et al. |
| 2003/0061491 A1 | 3/2003 | Jaskiewicz et al. |
| 2003/0097487 A1 | 5/2003 | Rietze et al. |
| 2003/0097504 A1 | 5/2003 | Oeda et al. |
| 2003/0097607 A1 | 5/2003 | Bessire |
| 2003/0110330 A1 | 6/2003 | Fujie et al. |
| 2003/0115204 A1 | 6/2003 | Greenblatt et al. |
| 2003/0115437 A1 | 6/2003 | Tomita |
| 2003/0131291 A1 | 7/2003 | Morrison et al. |
| 2003/0135577 A1 | 7/2003 | Weber et al. |
| 2003/0135609 A1 | 7/2003 | Carlson et al. |
| 2003/0145167 A1 | 7/2003 | Tomita |
| 2003/0149840 A1 | 8/2003 | Bolt |
| 2003/0163639 A1 | 8/2003 | Baum et al. |
| 2003/0167439 A1 | 9/2003 | Talagala et al. |
| 2003/0172150 A1 | 9/2003 | Kennedy |
| 2003/0182502 A1 | 9/2003 | Kleiman et al. |
| 2003/0189811 A1 | 10/2003 | Peeke et al. |
| 2003/0196002 A1 | 10/2003 | Nakayama et al. |
| 2003/0196147 A1 | 10/2003 | Hirata et al. |
| 2003/0204671 A1 | 10/2003 | Matsunami et al. |
| 2003/0212859 A1 | 11/2003 | Ellis |
| 2003/0221061 A1 | 11/2003 | El-Batal et al. |
| 2003/0221077 A1 | 11/2003 | Ohno et al. |
| 2003/0231420 A1 | 12/2003 | Kano et al. |
| 2004/0010660 A1 | 1/2004 | Konshak et al. |
| 2004/0010662 A1 | 1/2004 | Aruga |
| 2004/0024930 A1 | 2/2004 | Nakayama et al. |
| 2004/0034731 A1 | 2/2004 | Sivertsen |
| 2004/0068610 A1 | 4/2004 | Umberger et al. |
| 2004/0073747 A1 | 4/2004 | Lu |
| 2004/0078707 A1 | 4/2004 | Apperley et al. |
| 2004/0088482 A1 | 5/2004 | Tanzer et al. |
| 2004/0107325 A1 | 6/2004 | Mori |
| 2004/0111485 A1 | 6/2004 | Mimatsu et al. |
| 2004/0111560 A1 | 6/2004 | Takase et al. |
| 2004/0117517 A1 | 6/2004 | Beauchamp et al. |
| 2004/0117534 A1 | 6/2004 | Parry et al. |
| 2004/0128627 A1 | 7/2004 | Zayas |
| 2004/0139260 A1 | 7/2004 | Steinmetz |
| 2004/0148329 A1 | 7/2004 | Ogasawara et al. |
| 2004/0148460 A1 | 7/2004 | Steinmetz et al. |
| 2004/0148461 A1 | 7/2004 | Steinmetz |
| 2004/0153614 A1 | 8/2004 | Bitner et al. |
| 2004/0158676 A1 | 8/2004 | Kasmirsky et al. |
| 2004/0162940 A1 | 8/2004 | Yagisawa et al. |
| 2004/0169996 A1 | 9/2004 | Paul et al. |
| 2004/0177218 A1 | 9/2004 | Meehan et al. |
| 2004/0177228 A1 | 9/2004 | Leonhardt et al. |
| 2004/0193760 A1 | 9/2004 | Matsunami et al. |
| 2004/0193791 A1 | 9/2004 | Felton et al. |
| 2004/0199515 A1 | 10/2004 | Penny et al. |
| 2004/0221101 A1 | 11/2004 | Voorhees et al. |
| 2004/0236908 A1 | 11/2004 | Suzuki et al. |
| 2004/0243386 A1 | 12/2004 | Stolowitz et al. |
| 2004/0243699 A1 | 12/2004 | Koclances et al. |
| 2004/0267516 A1 | 12/2004 | Jibbe et al. |
| 2004/0268037 A1 | 12/2004 | Buchanan, Jr. et al. |
| 2004/0268069 A1 | 12/2004 | Satoyama et al. |
| 2005/0027900 A1 | 2/2005 | Pettey |
| 2005/0097132 A1 | 5/2005 | Cochran et al. |
| 2005/0117468 A1 | 6/2005 | Kano et al. |
| 2005/0120263 A1 | 6/2005 | Kano et al. |
| 2005/0120264 A1 | 6/2005 | Kano et al. |
| 2005/0138154 A1 | 6/2005 | Seto |

| | | |
|---|---|---|
| 2005/0154942 A1* | 7/2005 | Kano et al. .................. 714/43 |

FOREIGN PATENT DOCUMENTS

| EP | 0844561 | 5/1998 |
|---|---|---|
| EP | 1001345 | 5/2000 |
| EP | 1 237 087 | 9/2002 |
| EP | 1315074 | 5/2003 |
| JP | 02188835 | 7/1990 |
| JP | 5150909 | 6/1993 |
| JP | 9330182 | 12/1997 |
| JP | 09330184 | 12/1997 |
| JP | 10301720 | 11/1998 |
| JP | 2001142650 | 5/2001 |
| JP | 2001167040 | 6/2001 |
| JP | 2001337868 | 12/2001 |
| JP | 2002150746 | 5/2002 |
| JP | 2002/333954 | 11/2002 |
| JP | 2002333954 | 11/2002 |
| JP | 200336146 | 2/2003 |
| JP | 2004178557 | 6/2004 |

OTHER PUBLICATIONS

Adaptec FS4500 Fibre to SATA RAID, Data Sheet, 2 pp., available at: http://www.sunstarco.com/PDF%20Files/Adaptec%20FS4500%20SATA.pdf.

Infortrend EonStor A16F-R1211/S1211 FC-to-SATA RAID Subsystem product information, 3 pp., available at: http://www.infortrend.com/2_product/a16f-r(s)1211.asp.

Synetic Inc., SyneRAID -800SA, SCSI/Fibre-toSATA RAID Subsystem product information, 3 pp., available at: http://www.synetic.net/Synetic-Products/SyneRAID-Units/SyneRAID-800SATA/SyneRaid-800SA.html.

"SATA Disk System and Expansiom of Unit offer 3.5 TB storage", Product News Network, Nov. 1, 2004 2 pp.

Judd, Ian, "Device Services Interface", Online, Accredited Standards Committee, X3, Information Processing Systems, Jun. 19, 1996, pp. 1-8.

"Veritas Volume Manager Storage Administrator 3.2, Administrator's Guide", Online, Veritas Software Corporation, Jul. 2001, pp. 1-184.

EMC 2-Gigabit Disk-Array Enclosure EMC Corporation (DAE2), FC and ATA Models, Hardware Reference P/N 014003048, Rev A02.

Serial Attached SCSI and Serial ATA Compatibility, Intel, 2002, pp. 1-8.

ESG Product Brief EMC Mar. 2003, ClARiiON with ATA, pp. 1-2.

EMC CLARiiON Backup Storage Solutions Back-up-to-Disk Guide with LEGATO Networker Diskbackup Option (DBO), Engineering White Paper, Apr. 8, 2003, pp. 1-28.

EMC CLARiiON Backup Storage Solutions Backup-to-disk Guide with Computer Associates BrightStor ARCserve Backup, Engineering White Paper, Apr. 16, 2003, pp. 1-28.

EMC CLARiiON Backup Storage Solutions Backup-to-Disk: An Overview, Engineering White Paper, Mar. 3, 2003, pp. 1-10.

EMC CLARiiON Backup Storage Solutions Backup-to-Disk Guide with CommVault Galaxy, Engineering White Paper, Mar. 3, 2003, pp. 1-26.

EMC CLARiiON Backup Storage Solutions Backup-to-Disk Guide with Computer Associates BrightStor Enterprise Backup, Engineering White Paper, Apr. 16, 2003, pp. 1-23.

IBM Technical Disclosure Bulletin vol. 38, No. 7, Jul. 1995 (New York), "Foreground/Background Checking of Parity in a Redundant Array of Independent Disks-5 Storage Subsystem", pp. 455-458.

Laboratory Automation and Information Management 32, 1996, (Elsevier Science B.V.), R E Dessey, "Computer Connections", pp. 53-62.

* cited by examiner

FIG.11

| SECTOR NUMBER / DRIVE NUMBER | LBA #1-128 | LBA #129-256 | LBA #257-384 | ... |
|---|---|---|---|---|
| HDD#0 | 0 | 0 | 0 | ... |
| HDD#1 | 1 | 0 | 0 | ... |
| HDD#2 | 0 | 1 | 0 | ... |
| ... | ... | ... | ... | ... |

|  |  | LBA #1-128 | LBA #129-256 | LBA #257-384 | ... |
|---|---|---|---|---|---|
| HDD#0 | HEAD NUMBER | #0 | #0 | #1 | ... |
|  | EXISTENCE OF UPDATE | 1 | 0 | 0 | ... |
| HDD#1 | HEAD NUMBER | #0 | #0 | #1 | ... |
|  | EXISTENCE OF UPDATE | 0 | 0 | 0 | ... |
| ... | ... | ... | ... | ... | ... |

| DATA UNIT | DRIVE | DRIVE LBA |
|---|---|---|
| 000-129 | #0 | 000-064 |
| | #1 | 000-064 |
| 130-259 | #2 | 000-064 |
| | #0 | 065-129 |
| ⋮ | ⋮ | ⋮ |

DISK ARRAY SYSTEM AND METHOD FOR CONTROLLING DISK ARRAY SYSTEM

The present application is a continuation of application Ser. No. 10/766,015, filed Jan. 29, 2004 now U.S. Pat. No. 7,057,981, the contents of which are incorporated herein by reference.

BACKGROUND OF THE INVENTION

The present invention relates to a disk array system and a method for controlling a disk array system.

In recent years, with the increase of storage capacity in disk array systems, the importance thereof in information processing systems becomes greater and greater. It is therefore essential to write data correctly in a requested position and detect falseness in read data in response to a data input/output request from an information processing apparatus or the like.

JP-A-5-150909 discloses a method in which two heads are provided in a magnetic disk unit, and identical data read from the two heads are compared with each other so as to enhance the reliability in writing and reading in the magnetic disk unit.

When the method disclosed in JP-A-5-150909 is applied to a disk array system, two heads have to be provided in each magnetic disk unit. Thus, the unit cost for manufacturing each hard disk drive increases. Therefore, requested is a method for enhancing the reliability in a hard disk drive without changing its physical structure, for example, without adding any head thereto.

In addition, in disk array systems, serial ATA or parallel ATA hard disk drives have come to be used as well as fiber channel hard disk drives. This is because serial ATA or parallel ATA hard disk drives are indeed inferior in reliability to fiber channel hard disk drives but lower in price. There is therefore a demand for development of a method for enhancing the reliability in hard disk drives other than fiber channel ones in a disk array system constituted by a combination of fiber channel hard disk drives and other hard disk drives conforming to the serial ATA standard or the like.

SUMMARY OF THE INVENTION

The present invention was developed in consideration of the foregoing problems. It is an object of the invention to provide a disk array system and a method for controlling a disk array system.

In order to attain the foregoing object, a disk array system according to a principal configuration of the invention includes a first housing, a second housing and a controller. The first housing stores one or plural RAID groups. Each RAID group is formed out of a plurality of hard disk drives for transmitting/receiving data in accordance with a first interface standard. The hard disk drives are connected through a communication path. The second housing stores one or plural RAID groups. Each RAID group is formed out of a plurality of hard disk drives for transmitting/receiving data in accordance with a second interface standard. The hard disk drives are connected through the communication path via a plurality of converting units for converting the first and second interface standards into each other. The hard disk drives conforming to the second interface standard are lower in reliability than the hard disk drives conforming to the first interface standard. The controller includes a channel control portion, a disk control portion, a cache memory and a CPU. The channel control portion is connected to an information processing apparatus so as to be able to establish communication therewith. The channel control portion receives requests from the information processing apparatus. The requests include a read request to read data from the hard disk drives in the first or second housing and a write request to write data into the hard disk drives in the first or second housing. The disk control portion is connected to the plurality of hard disk drives in the first and second housings through the communication path so as to be able to establish communication with the plurality of hard disk drives in the first and second housings. The disk control portion performs input/output of data and parity data from/to the plurality of hard disk drives in the first and second housings in accordance with the read request or the write request received by the channel control portion. The parity data is data for detecting errors over a plurality of pieces of data including the data from/to the plurality of hard disk drives in the first and second housings. The cache memory temporarily stores data to be written into the plurality of hard disk drives. The CPU administers control over the channel control portion and the disk control portion. The controller reads a plurality of pieces of data including data stored in the plurality of hard disk drives in the second housing and parity data for the plurality of pieces of data, from all of the hard disk drives of the RAID group to which the hard disk drives storing the data belong, and examines whether the plurality of pieces of data including the data have been written in the hard disk drives with erroneous contents or not.

In addition, when writing data into one of the hard disk drives in the second housing in accordance with the write request from the information processing apparatus, the controller moves a head belonging to the hard disk drive from a position where the data has been stored. After that, the controller reads the data from a magnetic disk belonging to the hard disk drive and from the cache memory, and compares the two pieces of data read out.

In addition, when receiving, from the information processing apparatus, the write request to write data into one of the hard disk drives in the second housing, the controller forms a data unit out of data constituted by a plurality of sectors based on the data to be written and parity data for detecting data errors in the plurality of sectors, and writes the data unit into the hard disk drive. When receiving the read request to read the data from the information processing apparatus, the controller reads the data unit and examines whether the data is stored in the hard disk drive with erroneous contents or not.

Here, the first interface standard is, for example, a fiber channel standard. The second interface standard is, for example, a serial ATA standard. The communication path is, for example, an FC-AL (Fiber Channel-Arbitrated Loop). In addition, each converting unit is, for example, a converter for converting a fiber channel protocol and a serial ATA protocol into each other. In addition, each RAID group is to manage a plurality of hard disk drives as one group when the hard disk drives have an RAID configuration. Logical volumes serving as access units from the information processing apparatus are formed on each RAID group. An identifier referred to as LUN is assigned to each logical volume. When receiving from the information processing apparatus a write request to write data into a logical volume, the disk control portion writes the data and parity data for detecting errors in the data, into the hard disk drives forming the RAID group.

Thus, a disk array system and a method for controlling a disk array system can be provided according to the invention.

BRIEF DESCRIPTION OF THE DRAWINGS

The problems disclosed in this specification and solutions thereto will become more apparent from the following Detailed Description of Preferred Embodiments in conjunction with the accompanying drawings wherein:

FIG. 11 is a diagram showing an update control table according to the embodiment;

FIG. 15 is a diagram showing a head check control table according to the embodiment;

FIG. 20 is a diagram showing a data unit control table according to the embodiment.

DETAILED DESCRIPTION OF THE EMBODIMENTS

System Configuration

Figure 1A:
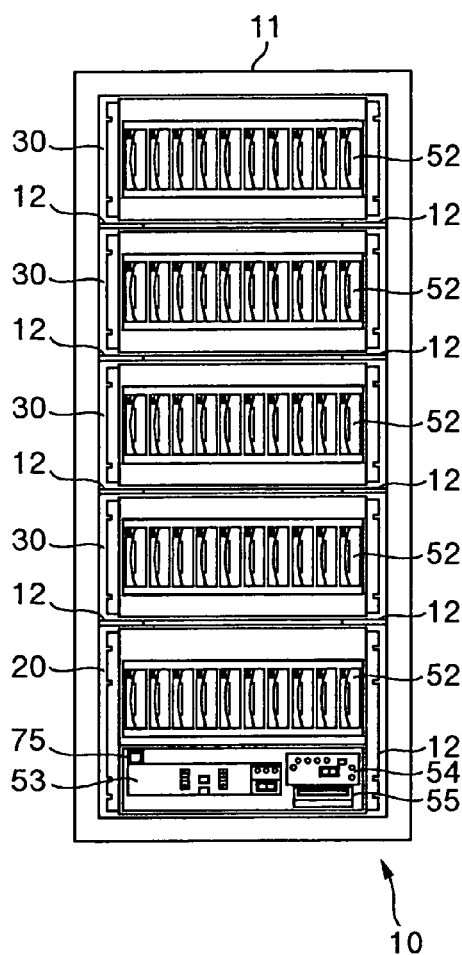
FIGS. 1A and 1B are diagrams showing the appearance of a disk array system according to an embodiment of the invention.
Figure 1B:
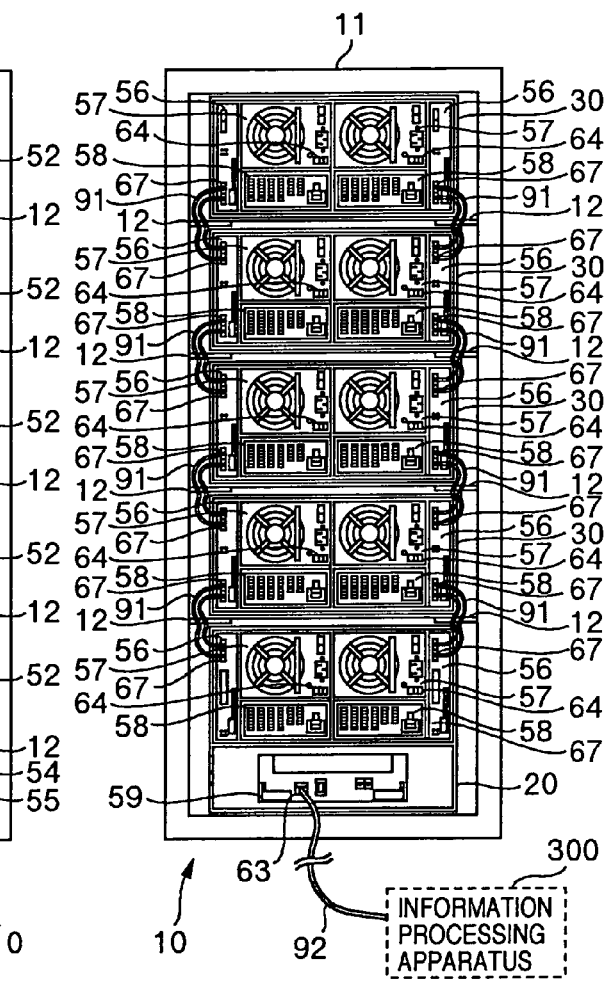
Figure 2A:
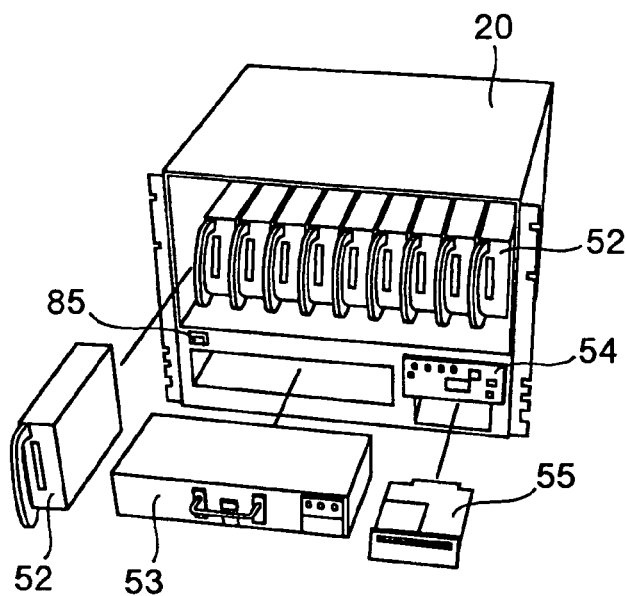
FIGS. 2A and 2B are diagrams showing the configuration of a master housing of the disk array system according to the embodiment.
Figure 2B:
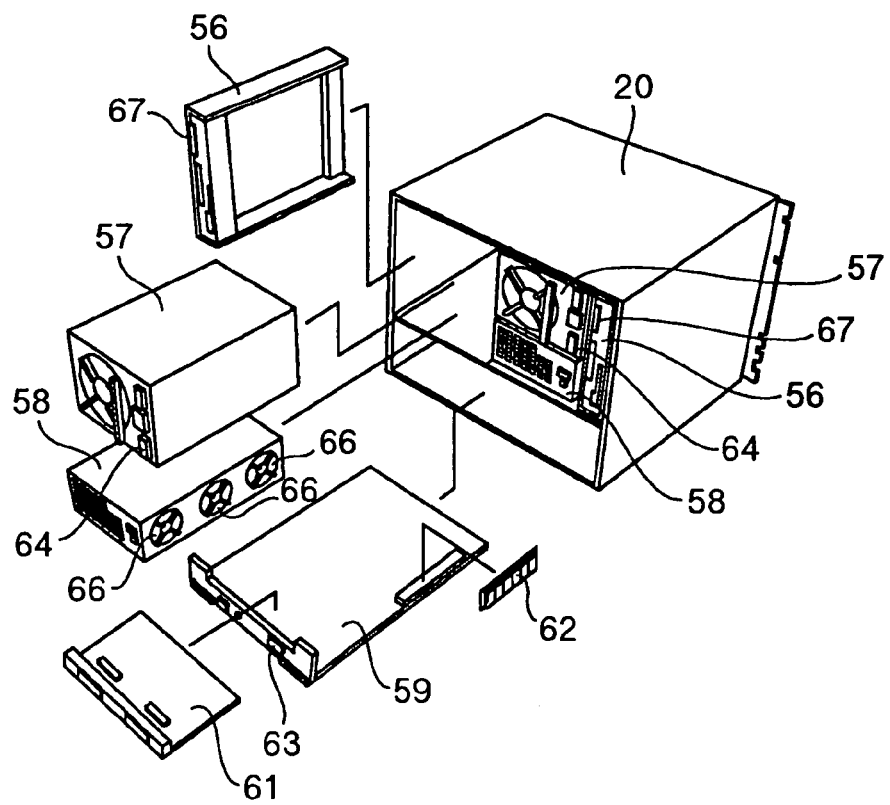
Figure 3A:
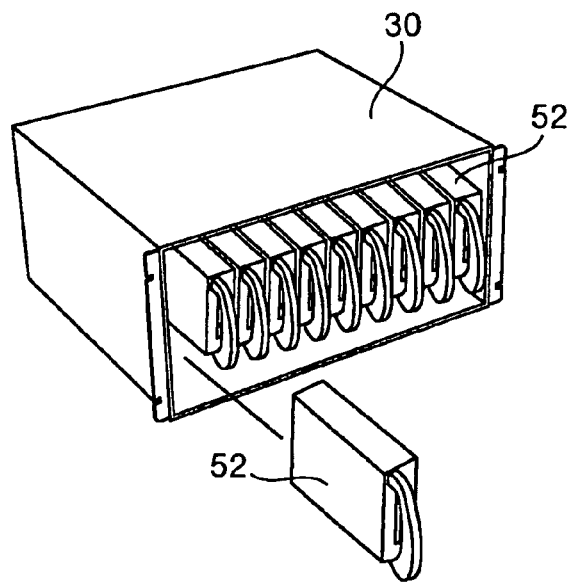
FIGS. 3A and 3B are diagrams showing the configuration of an expansion housing of the disk array system according to the embodiment.
Figure 3B:
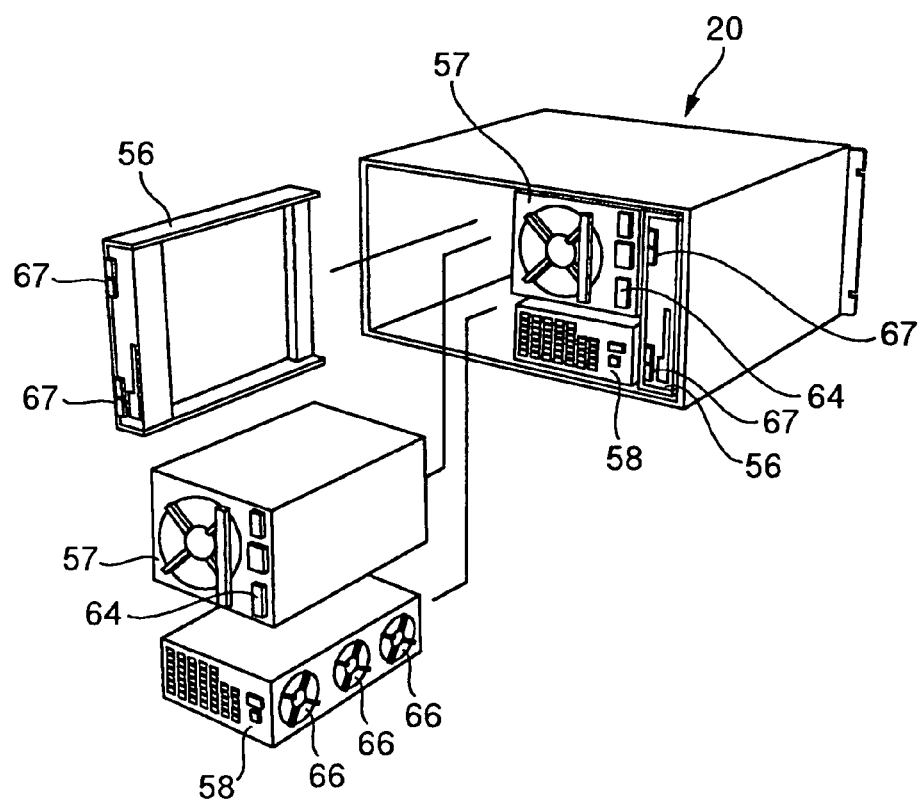

FIG. 1A is a front view of a disk array system 10 which will be described as an embodiment of the invention. FIG. 1B is a back view of the disk array system 10. FIG. 2A is a perspective view of a master housing 20 to be mounted on the disk array system 10, the master housing 20 being viewed from its front side. FIG. 2B is a perspective view of the master housing 20 viewed from its back side. FIG. 3A is a perspective view of an expansion housing 30 to be mounted on the disk array system 10, the expansion housing 30 being viewed from its front side. FIG. 3B is a perspective view of the expansion housing 30 viewed from its back side.

As shown in FIGS. 1A and 1B, the disk array system 10 is formed by using a rack frame 11 as a base. Mount frames 12 are formed in a plurality of stages disposed in the upper and lower on the inside left and right side surfaces of the rack frame 11, so as to extend in the front/rear direction. The master housing 20 and expansion housings 30 are mounted by pullout along the mount frames 12. As shown in FIGS. 2A and 2B, boards or units for providing various functions for the disk array system 10 are attached to the master housing 20 and the expansion housings 30.

As shown in FIG. 2A, a plurality of disk drive units 52 each filled with a hard disk drive 51 are inserted in parallel into the front upper stage of the master housing 20. Each hard disk drive 51 is a hard disk drive having a communication interface for providing a communication function conforming to an FC-AL standard, an SCSI1 (Small Computer System Interface 1) standard, an SCSI2 standard, an SCSI3 standard, a parallel ATA (AT Attachment) standard, a serial ATA standard, or the like.

A battery unit 53, a display panel 54 for displaying the operating conditions etc. of the hard disk drives 51, and a flexible disk drive 55 are inserted into the front lower stage of the master housing 20. The battery unit 53 includes a secondary battery. The battery unit 53 has a function as a backup power supply for supplying power to boards or units when power supply from an AC/DC power supply 57 stops due to power failure or the like. The display panel 54 is provided with display devices such as LED lamps or the like for displaying the operating conditions etc. of the hard disk drives 51. The flexible disk drive 55 is used, for example, for loading a maintenance program.

As shown in FIG. 2B, power supply controller boards 56 are inserted onto the opposite side surfaces in the back upper stage of the master housing 20 one by one. Each power supply controller board 56 is connected to a plurality of hard disk drives 51 so as to be able to establish communications therewith. For example, the power supply controller board 56 and the plurality of hard disk drives 51 are connected to be able to establish communications through a loop-like communication path such as a communication path making communications in an FC-AL system (topology).

Each power supply controller board 56 is mounted with circuits for monitoring the condition of the AC/DC power supply 57, monitoring the conditions of the hard disk drives 51, controlling the power supply to the hard disk drives 51, controlling the cooling capacity of a cooling unit, controlling the display devices on the display panel 54, monitoring the temperature of each portion of the housing, and so on. Incidentally, the cooling unit is a unit for cooling the inside of the disk array system 10 or the inside of the housing 20 or 30. For example, the cooling unit is an intercooler, a heat sink, a cooling fan of an air cooling type, or the like. The power supply controller board 56 is provided with a fiber channel cable connector 67, to which a fiber channel cable 91 is connected.

As shown in FIG. 2B, two AC/DC power supplies 57 are mounted in parallel in a space between the two power supply controller boards 56 in the back upper stage of the master housing 20. Each AC/DC power supply 57 supplies power to the hard disk drives 51, boards, units, etc. The AC/DC power supply 57 is connected to the power supply controller board 56 and set to be able to supply power to each hard disk drive 51 in accordance with a signal from the power supply controller board 56.

Incidentally, this embodiment is designed so that two power supply controller boards 56 and two AC/DC power supplies 57 are mounted redundantly in each of the master and expansion housings 20 and 30 in order to ensure security about the power supply to each housing 20, 30. However, one power supply controller board 56 and one AC/DC power supply 57 may be mounted in each housing 20, 30.

Each AC/DC power supply 57 is provided with a breaker switch 64 for turning on/off the output of the AC/DC power supply 57.

As shown in FIG. 2B, two air cooling fan units 58 are mounted in parallel under the AC/DC power supplies 57. Each cooling fan unit 58 is mounted with one or more cooling fans 66. The cooling fans 66 allow the air to flow into/from the housing to thereby discharge heat generated from the hard disk drives 51, the AC/DC power supplies 57, and so on, to the outside of the housing. Incidentally, vent pathways or vent holes for circulating the air through each master/expansion housing 20, 30 are formed in the housing 20, 30, and boards or units mounted thereon, so as to form a mechanism for discharging heat in the housing 20, 30 efficiently to the outside by the cooling fans 66. Although cooling fans 66 may be provided for each hard disk drive 51, it is preferable that larger cooling fans 66 are provided for each housing so that the number of chips or units can be reduced.

Each cooling fan unit 58 is connected to a controller board 59 or the power supply controller board 56 through a control line. The rotation number of each cooling fan 66 of the cooling fan unit 58 is controlled by the controller board 59 or the power supply controller board 56 through the control line.

As shown in FIG. 2B, one controller board 59 is inserted into the back lower stage of the master housing 20. The controller board 59 is mounted with a communication interface with the hard disk drives 51 mounted in the master housing 20 and the expansion housings 30, circuits for controlling the operations of the hard disk drives 51 (for example, controlling them in an RAID system) or monitoring the conditions of the hard disk drives 51, and so on.

Incidentally, although the power supply controller boards 56 control the power supply to the hard disk drives 51 or the cooling capacity of the cooling units in this embodiment, the controller board 59 may perform such control.

This embodiment adopts the mode in which the controller board 59 is mounted with a communication interface board 61 for providing a function of communication interface with an information processing apparatus 300, for example, a communication function conforming to an SCSI standard or a fiber channel standard, a cache memory 62 for storing data to be written into the hard disk drives 51 or data to be read therefrom, and so on. However, these functions may be mounted on another board.

The communication interface board 61 mounted on the controller board 59 is provided with an external connector 63 for making a connection to the information processing apparatus 300. The external connector 63 conforms to a predetermined interface standard such as SAN (Storage Area Network), LAN (Local Area Network) or SCSI built by a protocol such as fiber channel, Ethernet (registered trademark) or the like. The disk array system 10 is connected to the information processing apparatus 300 through a communication cable 92 connected to the connector 63.

Incidentally, two controller boards 59 may be mounted redundantly to ensure security about the control of the hard disk drives 51 in the master housing 20.

As shown in FIG. 3A, a plurality of disk drive units 52 receiving hard disk drives 51 are mounted in parallel on the front side of each expansion housing 30. As shown in FIG. 3B, power supply controller boards 56 are inserted onto the back opposite side surfaces of the expansion housing 30 one by one. In addition, two AC/DC power supplies 57 are mounted in parallel in a space between the two power supply controller boards 56. In addition, two cooling fan units 58 are mounted in parallel under the AC/DC power supplies 57. Each AC/DC power supply 57 is provided with a breaker switch 64 for turning on/off the power of the AC/DC power supply 57.

This embodiment is designed so that two power supply controller boards 56 and two AC/DC power supplies 57 are mounted redundantly in each expansion housing 30 in order to ensure security about the power supply to the expansion housing 30 as described above. However, one power supply controller board 56 and one AC/DC power supply 57 may be mounted in the expansion housing 30. Incidentally, the functions of the power supply controller boards 56 for controlling the power supply to the hard disk drives 51, controlling the cooling capacity of the cooling units, and so on, may be mounted on the controller board 59.

Figure 4:
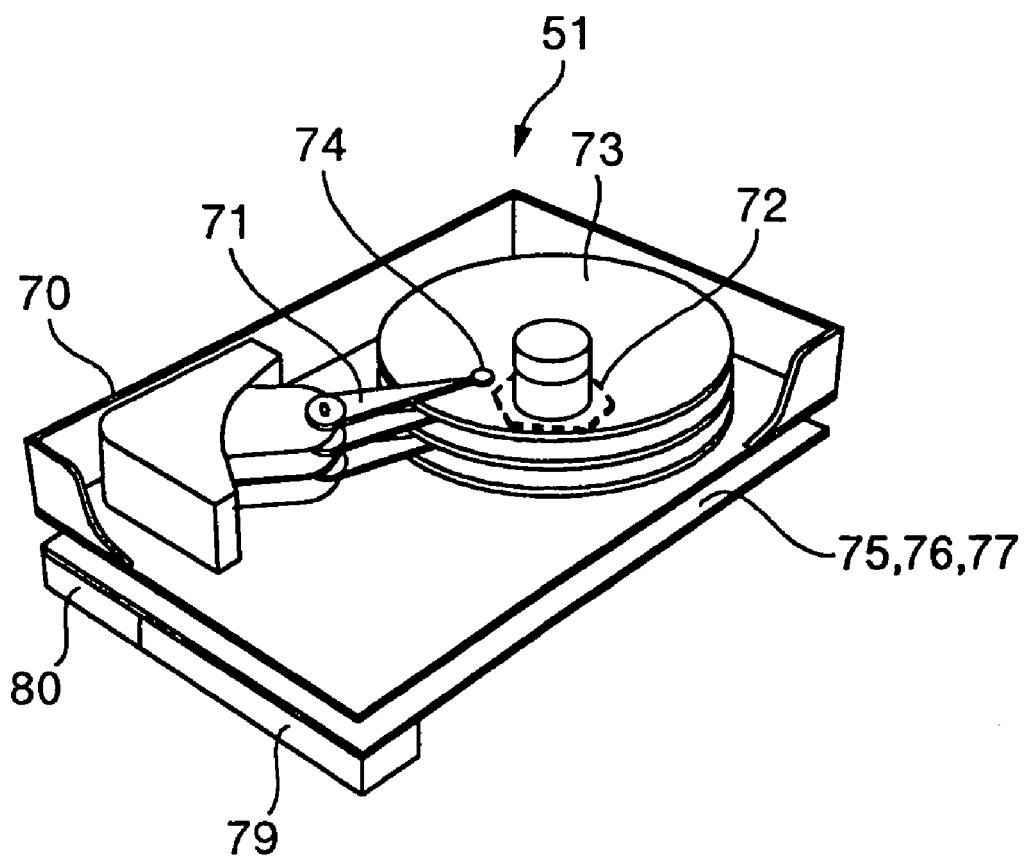
FIG. 4 is a diagram showing the configuration of a hard disk drive according to the embodiment.

FIG. 4 shows an example of the configuration of each hard disk drive 51 received in each disk drive unit 52. The hard disk drive 51 has a housing 70; and magnetic disks 73, actuators 71, a spindle motor 72, heads 74 for reading/writing data, a mechanism control circuit 75 for controlling mechanism portions such as the heads 74 and the like, a signal processing circuit 76 for controlling a read/write signal of data from/to each magnetic disk 73, a communication interface circuit 77, an interface connector 79 for inputting/outputting various commands or data therethrough, and a power supply connector 80 which are all disposed in the housing 70. Incidentally, a cache memory for storing data temporarily is included in the communication interface circuit 77. Incidentally, the cache memory belonging to the hard disk drive 51 is referred to as disk cache in order to be distinguished from a cache memory 62 in a controller 500 which will be described later.

Each hard disk drive 51 is, for example, a storage unit provided with Contact Start Stop (CSS) type 3.5-inch magnetic disks, load/unload type 2.5-inch magnetic disks, or the like. For example, each 3.5-inch magnetic disk has a communication interface of SCSI1, SCSI2, SCSI3, FC-AL or the like. On the other hand, for example, each 2.5-inch magnetic disk has a communication interface of parallel ATA, serial ATA or the like.

When each 2.5-inch magnetic disk is received in the housing 20, 30 of the disk array system 10, it may be received in a vessel having a 3.5-inch shape. Thus, the shock resistance performance of the magnetic disks can be improved. Incidentally, the 2.5-inch magnetic disk and the 3.5-inch magnetic disk differ from each other not only in communication interface but also in I/O performance, power consumption, life, and so on. The 2.5-inch magnetic disk is inferior in I/O performance to the 3.5-inch magnetic disk, and the life of the former is shorter than that of the latter. However, the 2.5-inch magnetic disk is superior to the 3.5-inch magnetic disk in that the power consumption of the former is smaller than that of the latter.

Hardware Configuration of Disk Array System

Figure 5:
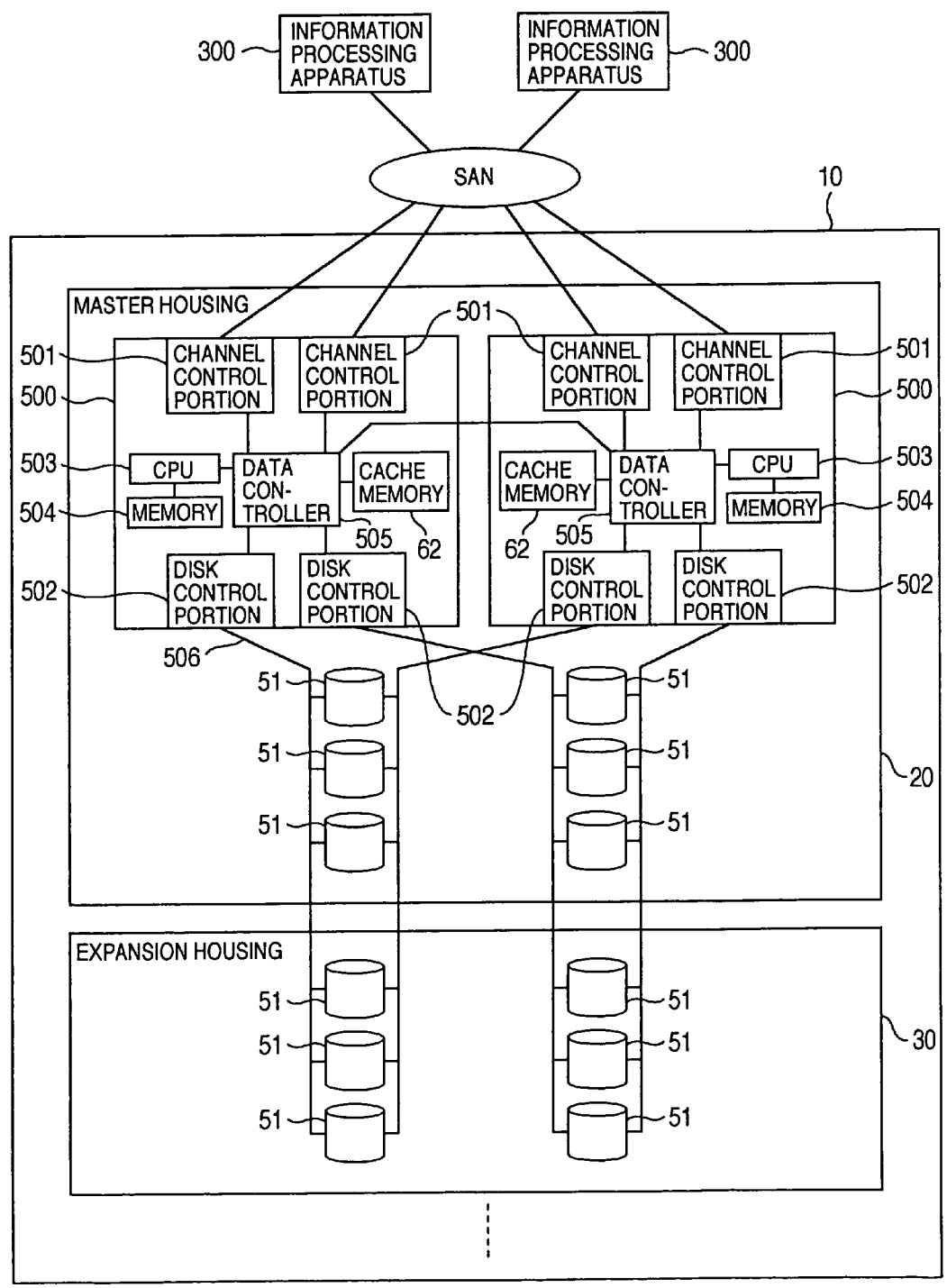
FIG. 5 is a diagram showing the configuration of the disk array system according to the embodiment.

FIG. 5 is a block diagram showing the hardware configuration of the disk array system 10 described as an embodiment of the invention.

As shown in FIG. 5, information processing apparatuses 300 are connected to the disk array system 10 through an SAN. The information processing apparatuses 300 are, for example, personal computers, work stations, mainframe computers, or the like.

The disk array system 10 has one master housing 20 and one or a plurality of expansion housings 30 as described previously. In this embodiment, the master housing 20 has controllers 500, hard disk drives 51, and so on. Each controller 500 has channel control portions 501, disk control portions 502, a CPU 503, a memory 504, a cache memory 62, a data controller 505, and so on. The controller 500 is mounted on the aforementioned controller board 59. On the other hand, each expansion housing 30 has hard disk drives 51 and so on. The hard disk drives 51 in the master and expansion housings are connected to the disk control portions 502 via an FC-AL 506 so as to be able to establish communication with the disk control portions 502. Incidentally, the connecting mode between each disk control portion 502 and each hard disk drive 51 will be described later in detail.

Each channel control portion 501 is an interface for making communication with the information processing apparatuses 300. The channel control portion 501 has a function of accepting a block access request in accordance with a fiber channel protocol.

Each disk control portion 502 is an interface for exchanging data with the hard disk drives 51 in accordance with an instruction from the CPU 503. The disk control portion 502 has a function of transmitting a data input/output request to the hard disk drives 51 in accordance with a protocol stetting down commands etc. for controlling the hard disk drives 51.

Figure 6:
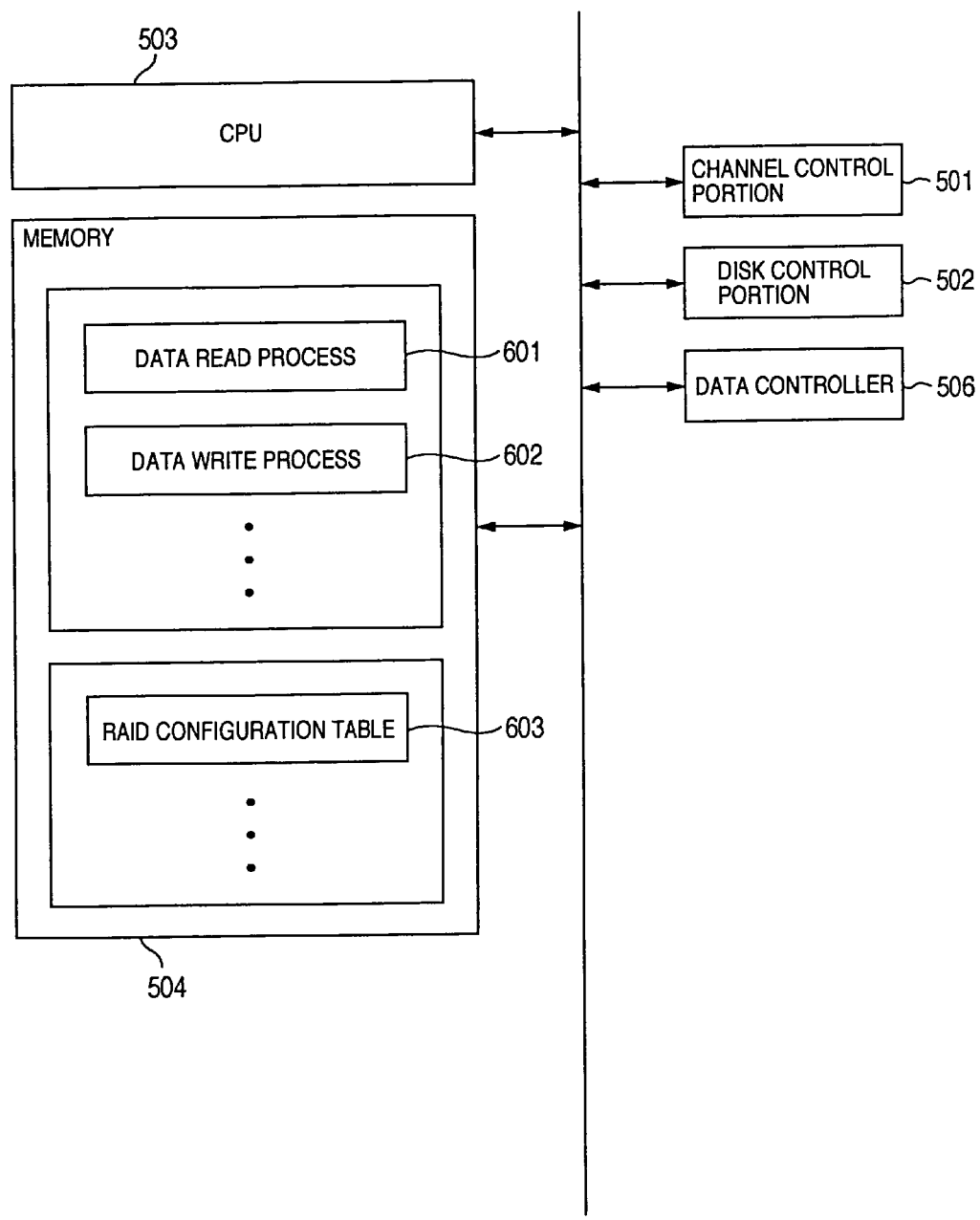
FIG. 6 is a diagram showing the state where microprograms to be executed by a CPU of a controller have been stored in a memory according to the embodiment.

The CPU 503 administers the control of the disk array system 10 as a whole. The CPU 503 executes microprograms stored in the memory 504, so as to control the channel control portions 501, the disk control portions 502, the data controller 505, and so on. The microprograms include a data READ process 601, a data WRITE process 602 and the like as shown in FIG. 6.

The cache memory 62 serves to temporarily store data to be exchanged between each channel control portion 501 and each disk control portion 502.

The data controller 505 performs data transfer between each channel control portion 501 and the cache memory 62 or between the cache memory 62 and each disk control portion 502 under the control of the CPU 503.

Each controller 500 has a function of controlling the hard disk drives 51 under an RAID level (for example, 0, 1 or 5) conforming to a so-called RAID (Redundant Array of Inexpensive Disks) system. In the RAID system, a plurality of hard disk drives 51 are managed as one group (hereinafter referred to as RAID group). Logical volumes serving as access units from the information processing apparatuses 300 are formed on each RAID group. An identifier referred to as LUN (Logical Unit Number) is assigned to each logical volume. RAID configuration information is stored in the memory 504 in the form of an RAID configuration table 603 as shown in FIG. 6. The RAID configuration table 603 is referred to by the CPU 503 when the CPU 503 executes the data READ process 601 or the data WRITE process 602.

Incidentally, for example, the disk array system may be not a system designed as described above but a system serving as an NAS (Network Attached Storage) designed to accept a data input/output request based on file name designation from any one of the information processing apparatuses 300 in accordance with a protocol such as an NFS (Network File System).

Connecting Mode of Hard Disk Drives

Next, description will be made on the connecting mode between each controller 500 and each hard disk drive 51.

Figure 7:
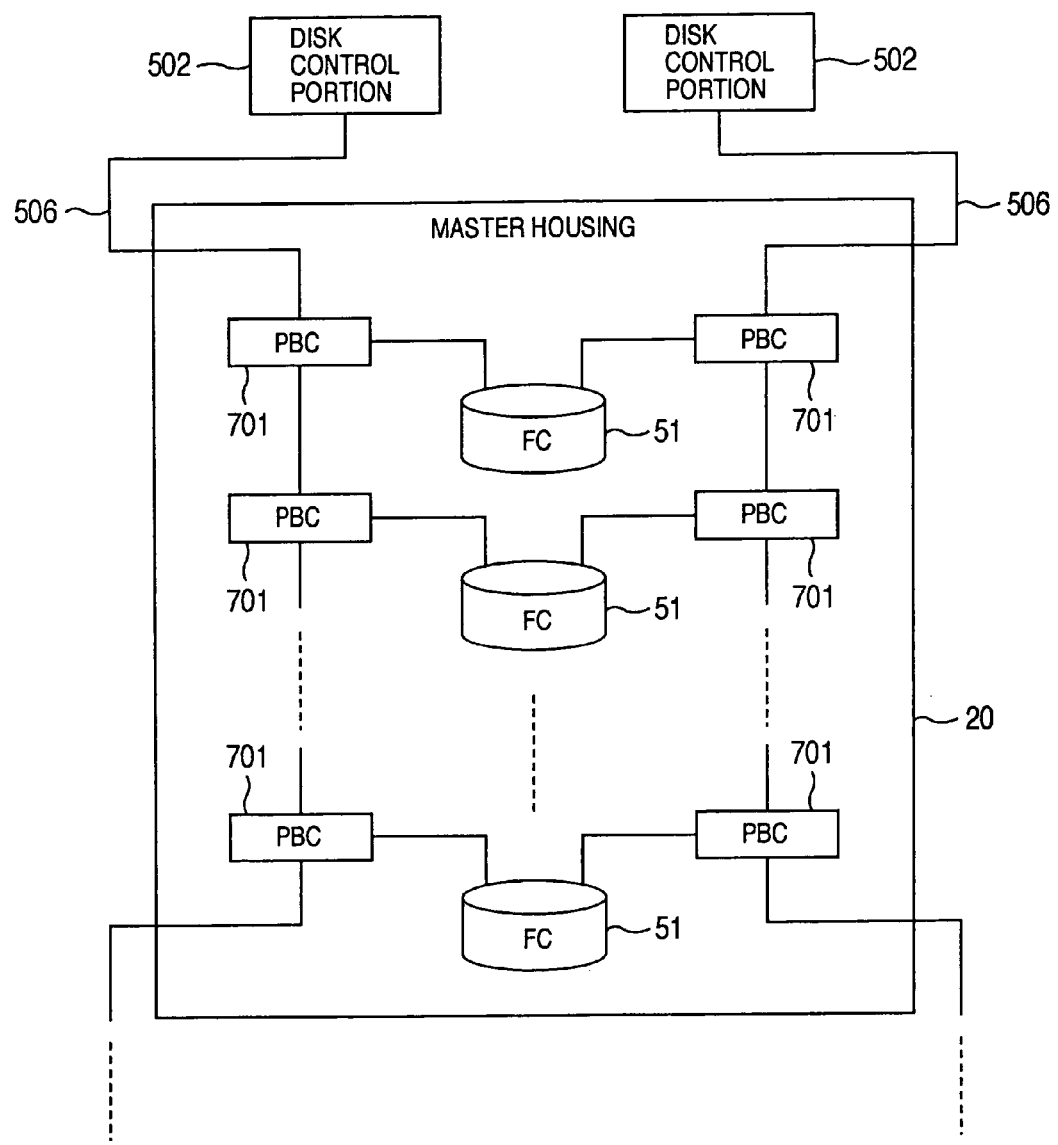
FIG. 7 is a diagram showing a mode for connecting fiber channel hard disk drives to a disk control portion of the controller according to the embodiment.

FIG. 7 shows a connecting mode between each disk control portion 502 and each fiber channel hard disk drive 51 stored in the master housing 20.

Each disk control portion 502 is connected to a plurality of hard disk drives 51 through an FC-AL 506. The FC-AL 506 has a plurality of PBCs (Port Bypass Circuits) 701. The fiber channel hard disk drives 51 are connected to the FC-AL 506 through the PBCs 701 respectively. Each PBC 701 is an electronic switch formed into a chip. The PBCs 701 also have a function of bypassing the disk control portions 502 or the hard disk drives 51 and thereby excluding them from the FC-AL 506 electrically. Specifically, when failures occur in some hard disk drives 51, the PBCs 701 separate the hard disk drives 51 from the FC-AL 506 so that communications can be established between any other hard disk drive 51 and each disk control portion 502.

In addition, the PBCs 701 allow the hard disk drives 51 to be removed and inserted while keeping the operation of the FC-AL 506. For example, when a new hard disk drive 51 is inserted, the hard disk drive 51 is incorporated into the FC-AL 506 so that communication can be established between the hard disk drive 51 and the disk control portion 502. Incidentally, a circuit board of the PBCs 701 may be provided on the rack frame 11 of the disk array system 10 or may be mounted partially or entirely on the controller board 59 or the power supply controller board 56.

Figure 8:
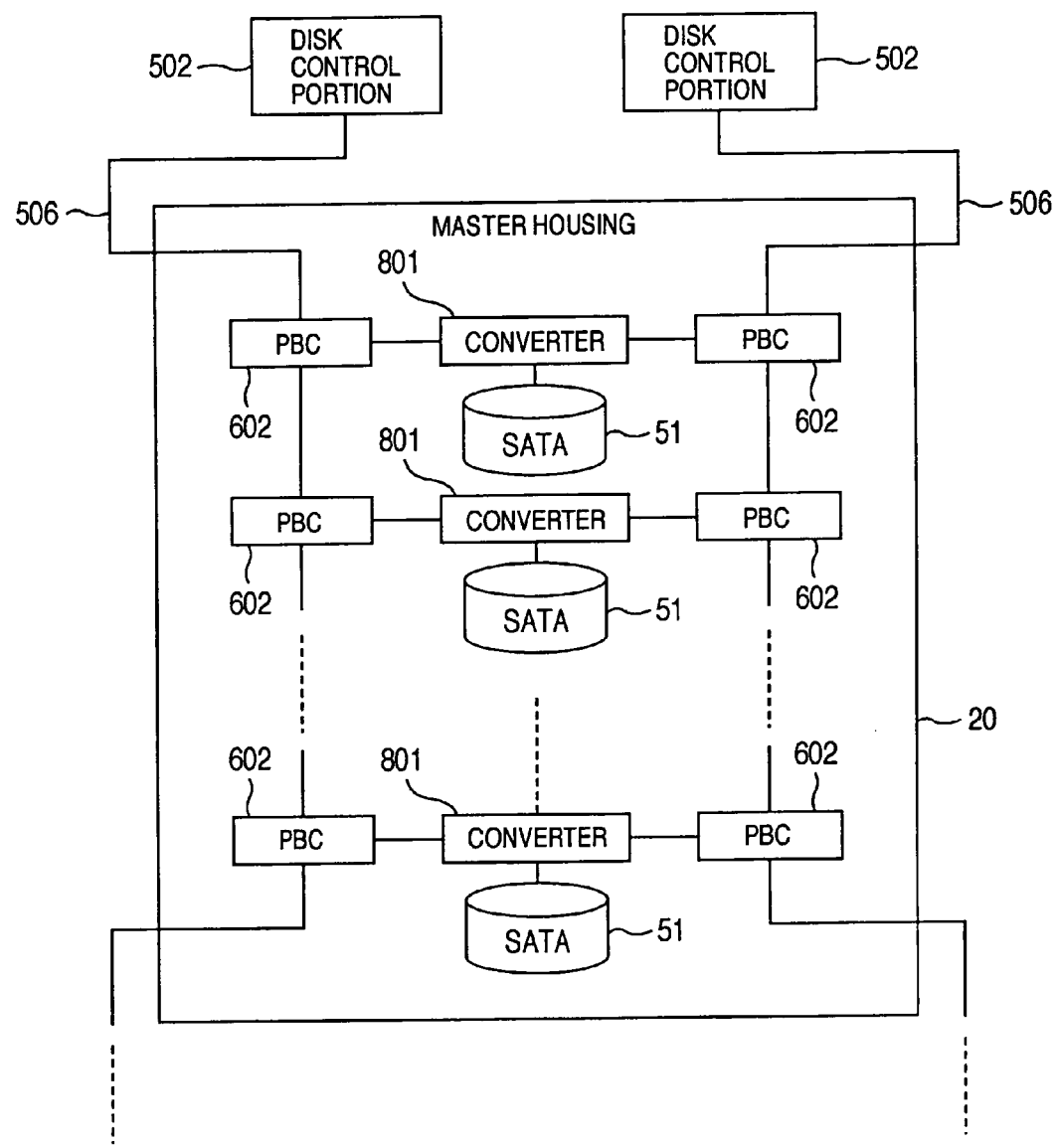
FIG. 8 is a diagram showing a first mode for connecting serial ATA hard disk drives to the disk control portion of the controller according to the embodiment.

FIG. 8 shows a connecting mode between each disk control portion 502 and each serial ATA hard disk drive 51 stored in the master housing 20.

Each hard disk drive 51 is connected to PBCs 602 of the FC-AL 506 through a converter 801. The converter 801 is a circuit for converting a fiber channel protocol and a serial ATA protocol into each other. The converter 801 is made of one chip in which a protocol converting function is incorporated. The converter 801 is provided in each disk drive unit 52.

Figure 9:
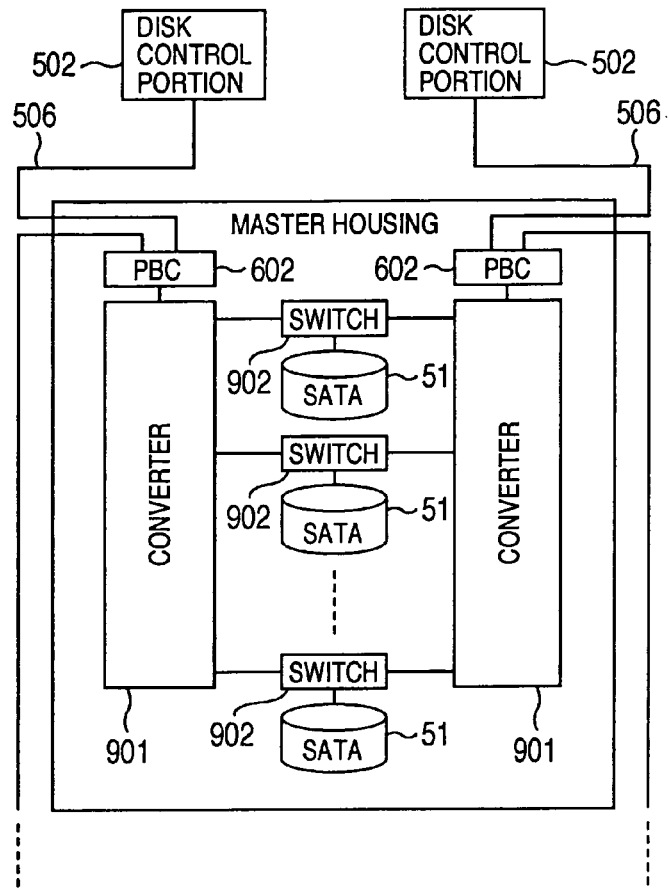
FIG. 9 is a diagram showing a second mode for connecting the serial ATA hard disk drives to the disk control portion of the controller according to the embodiment.

FIG. 9 is another connecting mode in which serial ATA hard disk drives 51 are stored in the master housing 20.

Each converter 901 is a circuit for converting a fiber channel protocol and a serial ATA protocol into each other in the same manner as the converter 801 in FIG. 8. The converter 901 is connected to a PBC 602 of an FC-AL 506. A plurality of hard disk drives 51 are connected to each converter 901 through switches 902 respectively. The switches 902 are circuits for selecting one converter 901 with which communication should be established when the hard disk drives 51 are connected to a plurality of converters 901. Each switch 902 is provided in each disk drive unit 52. Each converter 901 is formed out of one chip or a plurality of circuits in which a protocol converting function is incorporated. For example, the converter 901 can be implemented by the configuration of an SATA master device disclosed in "U.S. Patent Application Publication No. 2003/0135577". The converter 901 is mounted on the controller board 59, the power supply controller board 56 or the like.

Control for Enhancing Reliability

Description will be made on a method for enhancing reliability in reading from the hard disk drives 51 or in writing into the hard disk drives 51 in the disk array system 10 described above.

Parity Check in RAID Configuration

First, description will be made on a method for examining whether data stored in a hard disk drive 51 in the RAID configuration is in a false state or not. Here, the false state means a state where data is not written at a site specified by the disk control portion 502 and with contents specified likewise.

Figure 10:
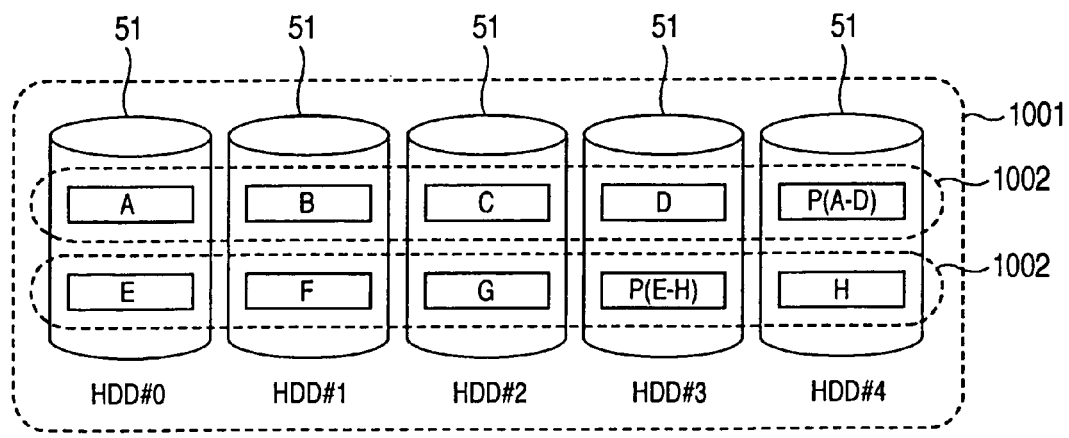
FIG. 10 is a diagram showing an example in which data are written in hard disk drives forming an RAID group according to the embodiment.

FIG. 10 shows a state where data are stored in the hard disk drives 51 in RAID-5. In RAID-5, an RAID group 1001 is formed out of a plurality of hard disk drives 51. In the example of FIG. 10, data A–D and parity data P(A–D) for detecting errors in the data A–D are stored in the hard disk drives 51. In the same manner, data E–H and parity data P(E–H) for the data E–H are stored. Such a combination of data and parity data is referred to as a stripe group 1002. In the RAID configuration having such strip groups 1002 formed therein, the controller 500 reading all the data and parity data of the strip group 1002 can examine whether the data are in a false state or not. First, in accordance with an instruction from the CPU 503, the disk control portion 502 reads the data A–D and the parity data P(A–D). Next, the CPU 503 performs parity check using the data A–D and the parity P(A–D). Thus, it can be examined whether any piece of the data A–D is in a false state or not.

When receiving a data read request from any one of the information processing apparatuses 300, the controller 500 may read all the data and parity data in a stripe group including the data to be read. Thus, the controller 500 can be prevented from reading false data from the hard disk drives 51 and transmitting the false data to the information processing apparatus 300. Incidentally, examining false data may be performed not at the time of receiving a data read request but at any desired timing. In such a manner, false data detection can be performed without giving any influence to the data reading performance.

In addition, using an update control table 1101 shown in FIG. 11, it is possible to examine whether data written in the hard disk drives 51 are in a false state or not. The update control table 1101 is constituted by drive numbers and sector numbers, and stored in the memory 504. In this embodiment, the sector numbers are defined by LBA (Logical Block Address), and managed by 128 LBA units as shown by LBA #1–128. Incidentally, the unit packaging the sector numbers is not limited to 128, but it may be any desired unit. When writing data into a hard disk drive 51 through the disk control portion 502, the CPU 503 changes the sector value of the hard disk drive 51 subjected to the writing, into "1" in the update control table 1101. The CPU 503 reads, through the disk control portion 502, all the data and parity data of a stripe group including the target sector of the hard disk drive 51 stored as "1" in the update control table 1101, and performs parity check. When the read data is not false, the CPU 503 changes the value of the sector in the update control table 1101 into "0". Receiving a data read request from any one of the information processing apparatuses 300 through the channel control portion 501, the CPU 503 refers to the update control table 1101 and confirms whether a sector storing the data to be read has been examined or not. When the sector storing the data has not been examined, the CPU 503 examines data of a stripe group including the data to be read in accordance with the aforementioned procedure. In such a manner, examination upon data written into each hard disk drive 51 is performed before reception of a read request to read the data. Thus, the data reading performance can be prevented from lowering. In addition, incompletion of examination is stored in the update control table 1101, and parity check is performed when unexamined data is read. Thus, false data can be prevented from being read.

Examination of Write Data

Next, description will be made on a method for examining whether data is written correctly or not when the data is written into a hard disk drive 51.

Figure 12:
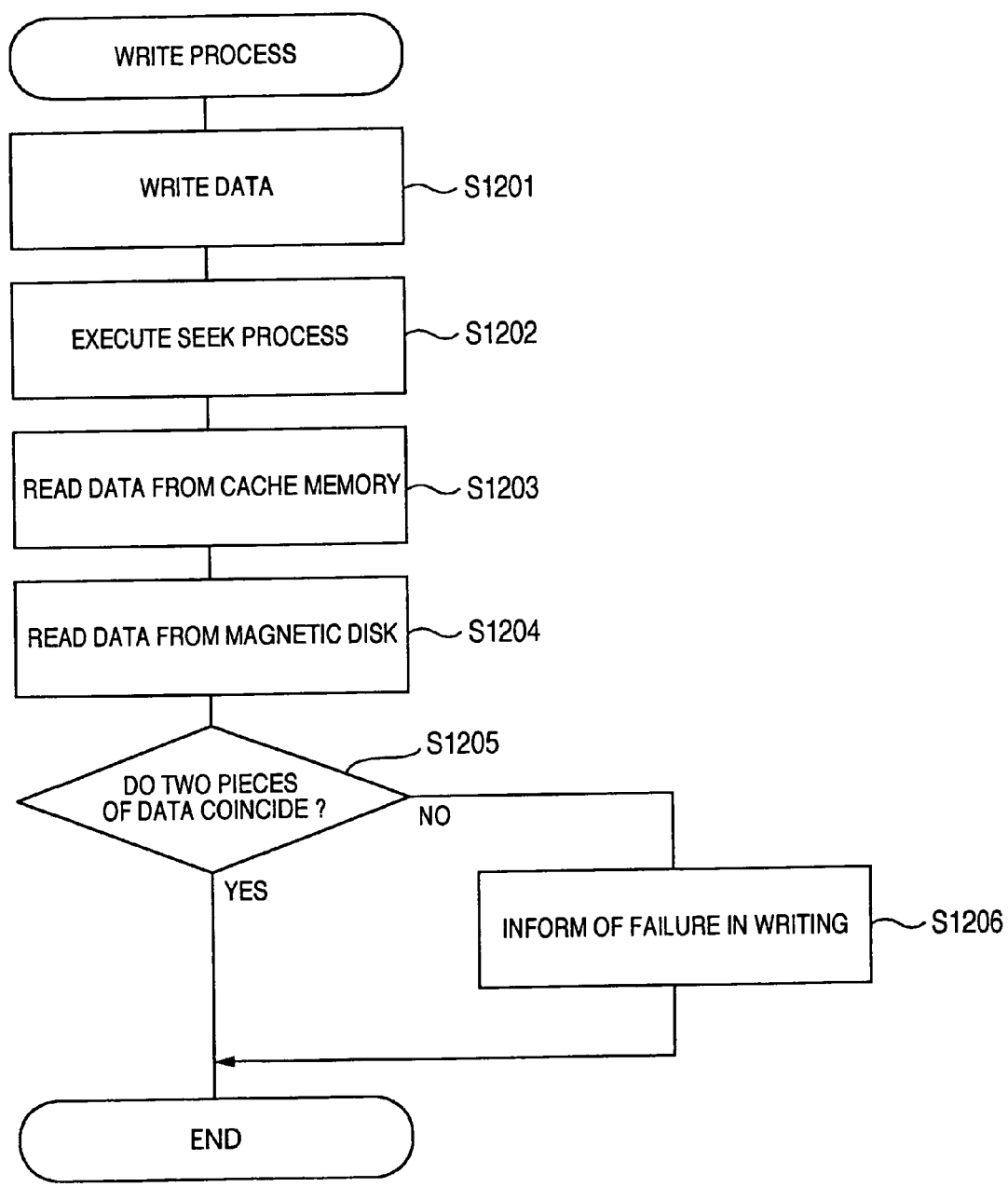
FIG. 12 is a flow chart for comparing data stored in a cache memory with data stored in a magnetic disk when data is written according to the embodiment.

FIG. 12 is a flow chart showing the control of the CPU 503 when the controller 500 writes data into a hard disk drive 51. Receiving a data write request from any one of the information processing apparatuses 300 through the channel control portion 501, the CPU 503 transmits to the disk control portion 502 an instruction to write the data into a hard disk drive 51 (S1201). Then, the CPU 503 transmits to the disk control portion an instruction to execute a seek process for moving the position of a head of a magnetic disk where the data has been written (S1202). Next, the CPU 503 reads the data from the cache memory 62 (S1203), and reads the data from the magnetic disk (S1204). The CPU 503 compares the data from the cache memory 62 and the data from the magnetic disk so as to examine whether they coincide with each other (S1205). When the two pieces of data do not coincide with each other, the CPU 503 informs the information processing apparatus 300 of the fact that writing has not been performed normally (S1206).

When the data stored in the magnetic disk is thus compared with the data stored in the cache memory 62, it is possible to confirm whether the data has been written in the magnetic disk correctly or not. In addition, even when the written data is in a false state, the data survives in the cache memory 62. Thus, there is no fear that the data is lost. Incidentally, when a head belonging to a hard disk drive having a magnetic disk is moved by a seek process or the like before data to be compared is read from the magnetic disk and from the cache memory 62, it is possible to prevent the head from reading twice in one and the same position when the position at the time of writing is false.

In the processing in FIG. 12, all the written data are read from the cache memory 62 and from the magnetic disk, and the two pieces of data are compared for examining the data. However, not all the data but a part of the data, for example, one segment at the head of the data and one segment at the end of the data may be read and compared. For example, large-size data (sequential data) are often written in serial ATA hard disk drives because they are used for applications such as data backup. In such a case, if data stored in a magnetic disk is compared with data stored in the cache memory 62 for all the written data, the performance in writing processing will be deteriorated conspicuously. In addition, when there occurs an error in writing position or the like when sequential data are written, it is highly likely that all the data are false. Therefore, in most cases, it can be judged whether the data are false or not if a part of the data is examined. That is, when comparison is performed upon a part of written data, for example, one segment at the head of the data and one segment at the end of the data, it is possible to check false data while preventing the performance in writing processing from being deteriorated.

Figure 13:
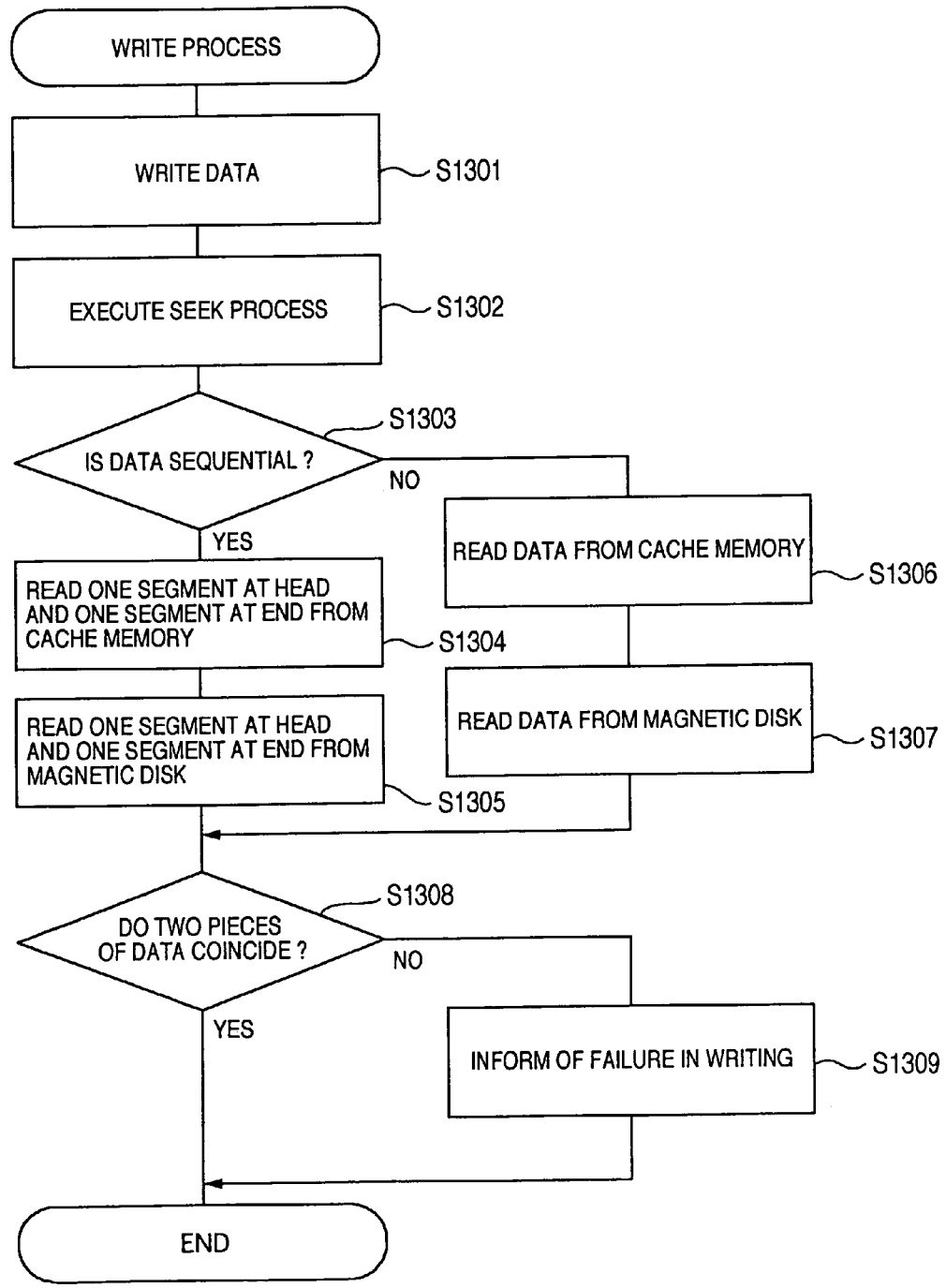
FIG. 13 is a flow chart for comparing data stored in a cache memory with data stored in a magnetic disk in consideration of the data size when data is written according to the embodiment.

Alternatively, the method for examining data written in the hard disk drive 51 may be changed in accordance with the size of the data. FIG. 13 is a flow chart showing the processing for changing the examination method in accordance with whether the written data is sequential data or not. The CPU 503 transmits to the disk control portion 502 an instruction to write data into a hard disk drive 51 (S1301). Then, the CPU 503 transmits to the disk control portion an instruction to execute a seek process for moving the position of the head of the magnetic disk where the data has been written (S1302). The CPU 503 judges whether the data is sequential data or not (S1303). Incidentally, the judgment as to whether the data is sequential data or not is performed based on whether the size of the written data reaches a predetermined size or not.

When the data is sequential data, the CPU 503 reads one segment at the head of the data and one segment at the end of the data from the cache memory 62 and from the magnetic disk. On the contrary, when the data is not sequential data, the CPU 503 reads all the data from the cache memory 62 and from the magnetic disk (S1306 and S1307). After that, the CPU 503 compares the two pieces of read data with each other and examines whether they coincide with each other (S1308). When they do not coincide, the CPU 503 informs the information processing apparatus 300 of the fact that writing has not been performed normally (S1309).

When the written data is sequential data, comparison as to a part of the data is made between data stored in the magnetic disk and data stored in the cache memory 62 in such a manner. Thus, it is possible to detect data falseness while suppressing the lowering of the performance in writing processing. On the contrary, when the written data is not sequential data, comparison as to all the written data is made between data stored in the magnetic disk and data stored in the cache memory 62. Thus, it is possible to detect data falseness perfectly without lowering the performance in writing processing as conspicuously as in the case of sequential data.

Figure 14:
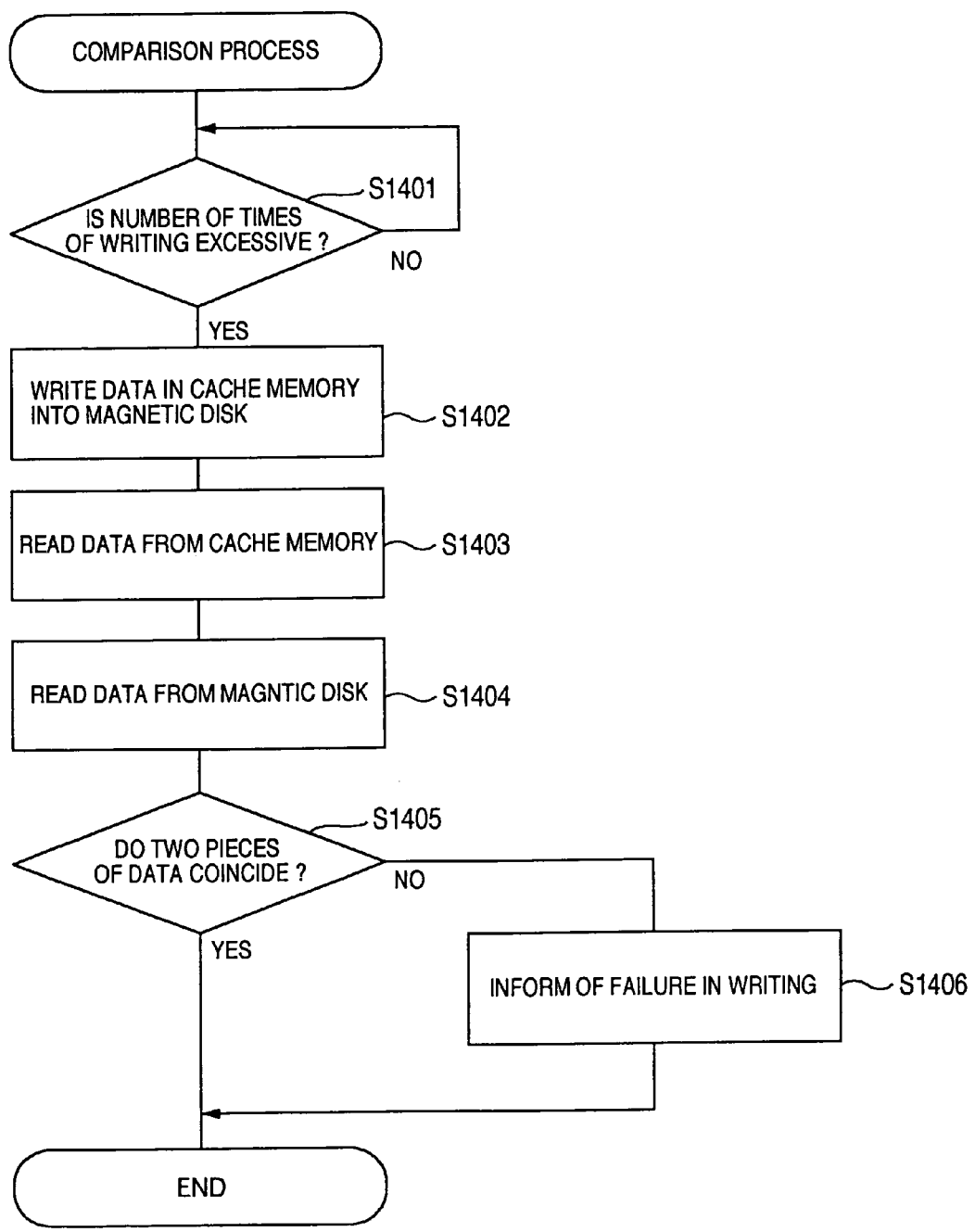
FIG. 14 is a flow chart for comparing data stored in a cache memory with data stored in a magnetic disk when the data stored in the cache memory is written into the magnetic disk according to the embodiment.

In order to improve the performance in writing data, each hard disk drive 51 may have a function as follows. That is, when receiving a data write request from the controller 500, the hard disk drive 51 writes the data only into the disk cache, and informs the controller 500 of the completion of writing. In this case, the written data cannot be examined in the method described in FIGS. 12 and 13. FIG. 14 is a flow chart of processing for examining written data when the hard disk drive 51 has such a function. The CPU 503 monitors the hard disk drive 51 as to whether the number of times of writing into the hard disk drive 51 has exceeded a predetermined number or not (S1401). When it exceeds the predetermined number, the CPU 503 gives the hard disk drive through the disk control portion 502 an instruction to write the data stored in the disk cache into a magnetic disk (S1402). Then, the CPU 503 reads the data from the cache memory 62 and from the magnetic disk (S1403 and S1404). The CPU 503 confirms whether the data from the cache memory 62 and the data from the magnetic disk coincide with each other or not (S1405). When they do not coincide, the CPU 503 informs the information processing apparatus 300 of the fact that writing has not been performed normally (S1406). Thus, data falseness can be detected in spite of use of the aforementioned function of enhancing the performance in writing processing. Incidentally, in the processing in FIG. 14, data written into the magnetic disk and data written into the cache memory are compared when the number of times of writing exceeds a predetermined number. However, the examination may be made whenever a predetermined time has passed or whenever the disk cache has no free space.

In the case of a serial ATA hard disk drive 51, data is often written incorrectly due to a failure of its head. Therefore, description will be made on a method for detecting a failure of a head of a hard disk drive 51 when data is read from the hard disk drive 51.

FIG. 15 is a diagram showing a head check control table 1501. The head check control table 1501 is constituted by drive numbers, head numbers and sector numbers, and stored in the memory 504. Each sector number is defined by LBA in the same manner as in the update control table 1101. When data is written into the hard disk drive 51 through the disk control portion 502, the CPU 503 changes the value of "existence of update" of the sector of the head with which the data was written, into "1" in the head check control table 1501.

Figure 16:
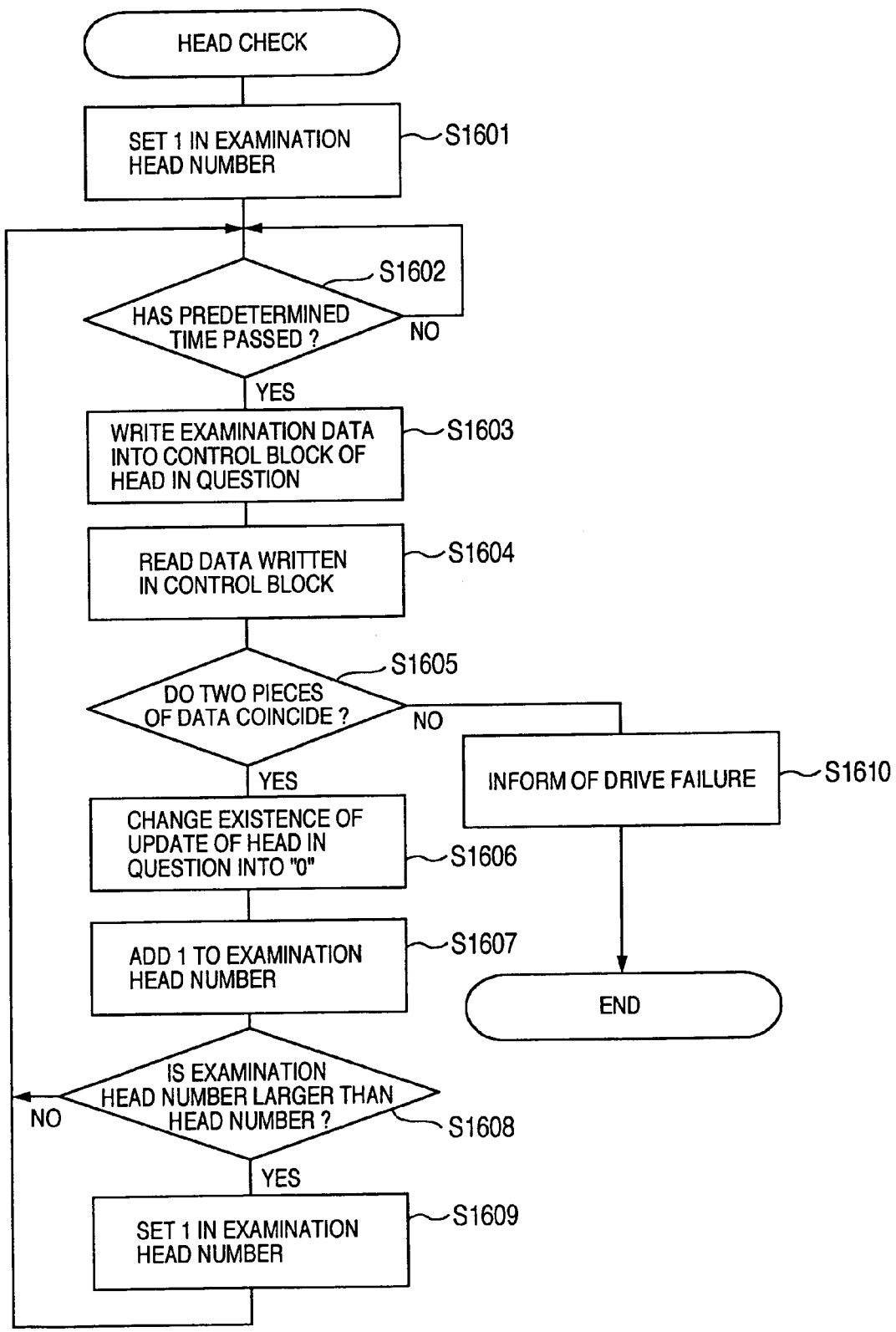
FIG. 16 is a flow chart for head check to be performed periodically according to the embodiment.

FIG. 16 is a flow chart of the head check processing to be executed by the CPU 503. The CPU 503 sets 1 as the initial value of an examination head number (S1601). The CPU 503 waits a predetermined time (S1602), and writes examination data into a control block of a magnetic disk using a head specified by the examination head number (S1603). Incidentally, the control block is a predetermined storage area on the magnetic disk. Next, the CPU 503 reads the data written in the control block (S1604), and confirms whether the read data and the examination data coincide with each other or not (S1605).

When the two pieces of data coincide with each other, the CPU 503 concludes that there is no abnormality in the head, and changes the value of "existence of update" of the head into "0" in the head check control table 1501 (S1606). The CPU 503 adds 1 to the examination head number (S1607). The CPU 503 confirms whether the examination head number is larger than a maximum value of the head number or not (S1608). When the examination head number is larger, the CPU 503 sets 1 as the examination head number. The CPU 503 executes the head check processing upon the set head number repeatedly.

When the data read from the control block does not coincide with the examination data, the CPU 503 informs the information processing apparatus 300 of the fact that there occurs an abnormality in the hard disk drive 51 in question, and then terminates the processing.

Figure 17:
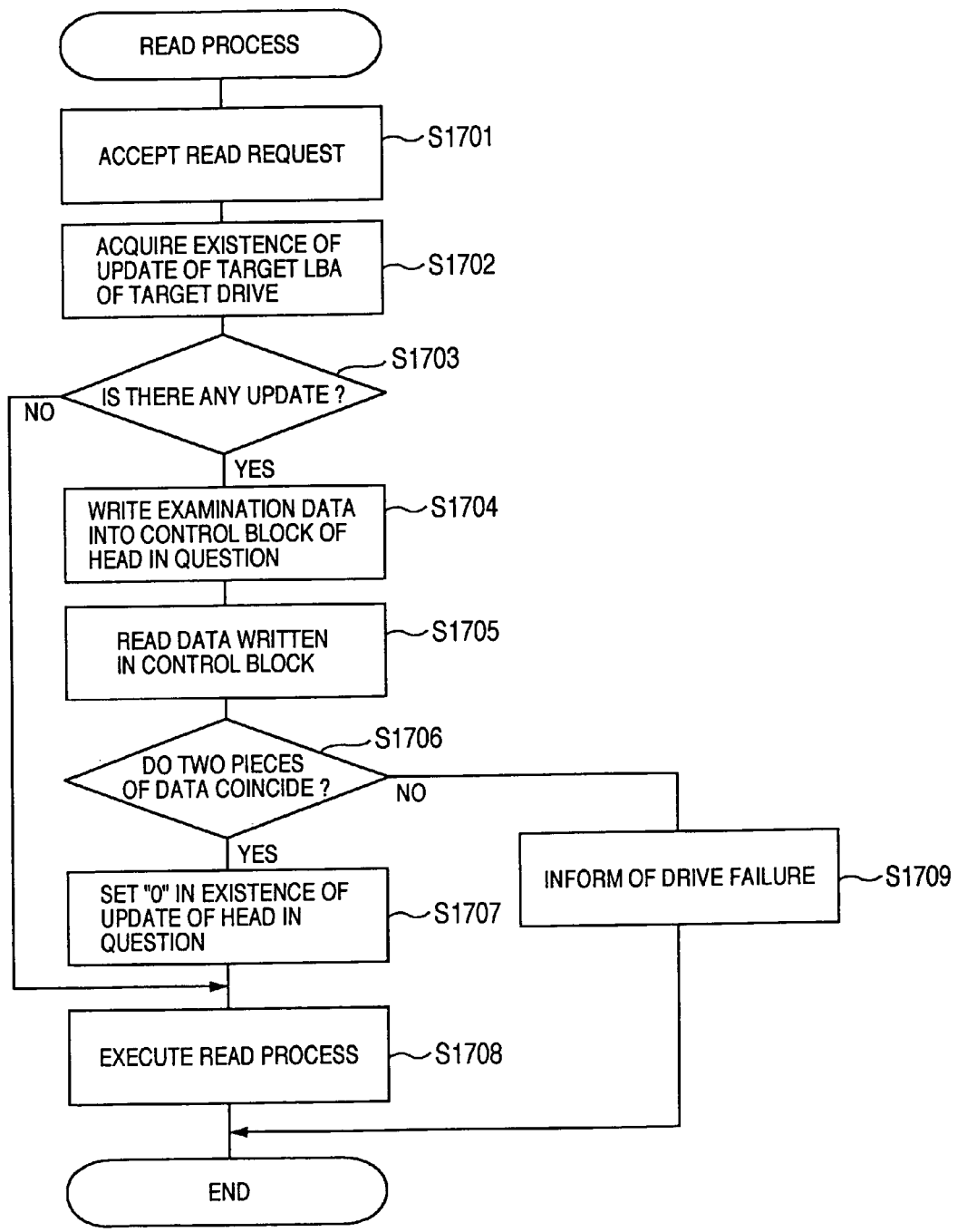
FIG. 17 is a flow chart for carrying out the head check when data is read according to the embodiment.

FIG. 17 is a flow chart of processing when the CPU 503 receives a data read request from any one of the information processing apparatuses 300. The CPU 503 receives a data read request from the information processing apparatus 300 through the channel control portion 501 (S1701). The CPU 503 confirms the value of "existence of update" of a target sector of a hard disk drive 51 where the data is stored in the head check control table 1501 (S1702 and S1703). The "existence of update" whose value is "1" indicates the state where the aforementioned head check processing has not been performed though data writing has been performed on the LBA of the hard disk drive 51 in question. When the value of "existence of update" is "0", the CPU 503 reads the data from the hard disk drive 51 (S1708).

When the value of "existence of update" is "1", the CPU 503 writes examination data into a control block of a magnetic disk using the head in question in the same manner as in the aforementioned head check processing (S1704). Incidentally, the control block is a predetermined storage area on the magnetic disk. Next, the CPU 503 reads the data written in the control block (S1705), and confirms whether the read data coincides with the examination data or not (S1706).

When the two pieces of data coincide with each other, the CPU 503 concludes that there is no abnormality in the head, and changes the value of "existence of update" of the head into "0" in the head check control table 1501 (S1707). Then, the CPU 503 reads the requested data from the hard disk drive 51 in accordance with the read request (S1708).

When the data read from the control block does not coincide with the examination data, the CPU 503 notifies the information processing apparatus 300 of the fact that there occurs an abnormality in the hard disk drive 51 in question (S1709), and then the CPU 503 terminates the processing without reading the data from the hard disk drive 51.

In such a manner, when data written in the hard disk drive 51 is read, it is possible to confirm whether the head with which the data was written is normal or not. When the head is abnormal, there is a possibility that the data is not written correctly or there is a possibility that the data cannot be read correctly. By detecting abnormality in the head when data is read, it is possible to prevent false data from being read.

Examination Based on Parity Assignment

According to the aforementioned method in which all the data of a stripe group in the RAID configuration are read and subjected to parity check, it is not possible to determine which data of the stripe group is in a false state. It is indeed possible to prevent false data from being read, but it is not possible to restore the false data. Thus, the data may be lost. Therefore, description will be made on a method for assigning parity data to each piece of data separately from parity data in the stripe group.

The CPU 503 generates parity data for detecting errors for a plurality of sectors serving as a minimal unit with which data is written into each hard disk drive 51. In this embodiment, a combination of data and parity data for such a plurality of sectors is referred to as data unit. Receiving a data write request from any one of the information processing apparatuses 300 through the channel control portion 501, the CPU 503 forms a data unit from the data to be written. The CPU 503 writes the data unit into the hard disk drive 51 through the disk control unit 502.

Figure 18:
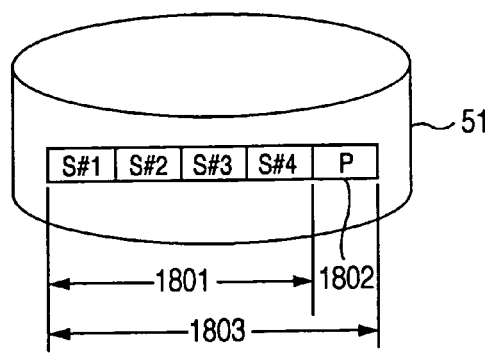
FIG. 18 is a diagram showing an example in which a data unit has been written in a hard disk drive according to the embodiment.

FIG. 18 is a diagram showing the state where one piece of data 1801 is written in a hard disk drive. The data 1801 is constituted by a plurality of sectors S#1 to S#4, and a data unit 1803 is formed out of the data 1801 and parity data 1802 for the data 1801 of the plurality of sectors. Receiving a data read request from any one of the information processing apparatuses 300 through the channel control portion 501, the CPU 503 reads the data unit 1803 of the requested data through the disk control portion 502, and performs parity check on the data so as to examine whether the data is in a false state or not. In such a manner, by reading only the data to be read in response to the read request, it is possible to judge whether the data is in a false state or not. In addition, when the hard disk drives 51 have a redundant RAID configuration as RAID 5, the data can be restored using other data and parity data in the stripe group. Thus, there is no fear that the data is lost.

When there occurs a failure of a head or the like in one hard disk drive 51, it is highly likely that there appear a plurality of false sectors. Assume that a plurality of sectors of the data unit 1803 become false when the data unit 1803 is written into one hard disk drive 51. In such an event, there is a case where falseness cannot be detected by parity check.

Figure 19:
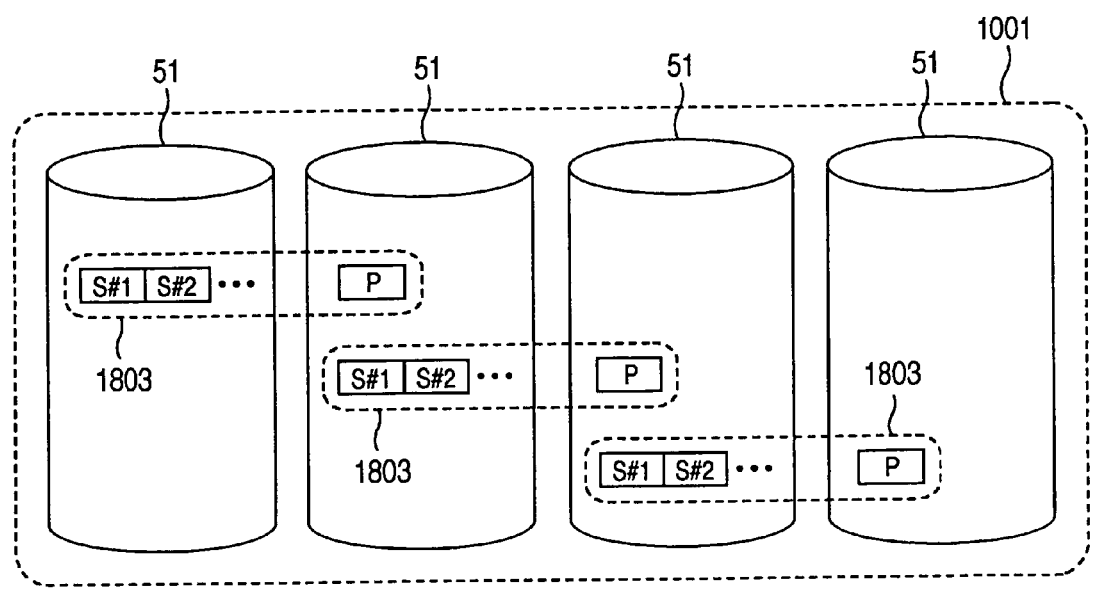
FIG. 19 is a diagram showing an example in which each data unit has been written and distributed over a plurality of disk drives according to the embodiment.

Therefore, as shown in FIG. 19, the CPU 503 may write and distribute the data unit 1803 among a plurality of hard disk drives 51 in the RAID group through the disk control portion 502. FIG. 20 is a diagram showing a data unit control table 2001. The data unit control table 2001 shows the correspondence of data units 1803 each constituted by a plurality of sectors to LBAs of hard disk drives 51. The example of FIG. 20 shows that one data unit 1803 formed out of 130 sectors 000–129 is constituted by LBAs 000–064 of hard disk drives 51 whose drive numbers are #0 and #1. Receiving a data write request from any one of the information processing apparatuses 300, the CPU 503 refers to the data unit control table 2001, and writes and distributes each data unit 1803 of the requested data among a plurality of hard disk drives 51.

Thus, even when there occurs a failure in one hard disk drive, it is possible to increase the probability that falseness of data can be detected.

Environment of Mixture of Fiber Channel and Serial ATA

Next, description will be made on the disk array system 10 in which fiber channel hard disk drives 51 and serial ATA hard disk drives 51 are mixed.

Figure 21:
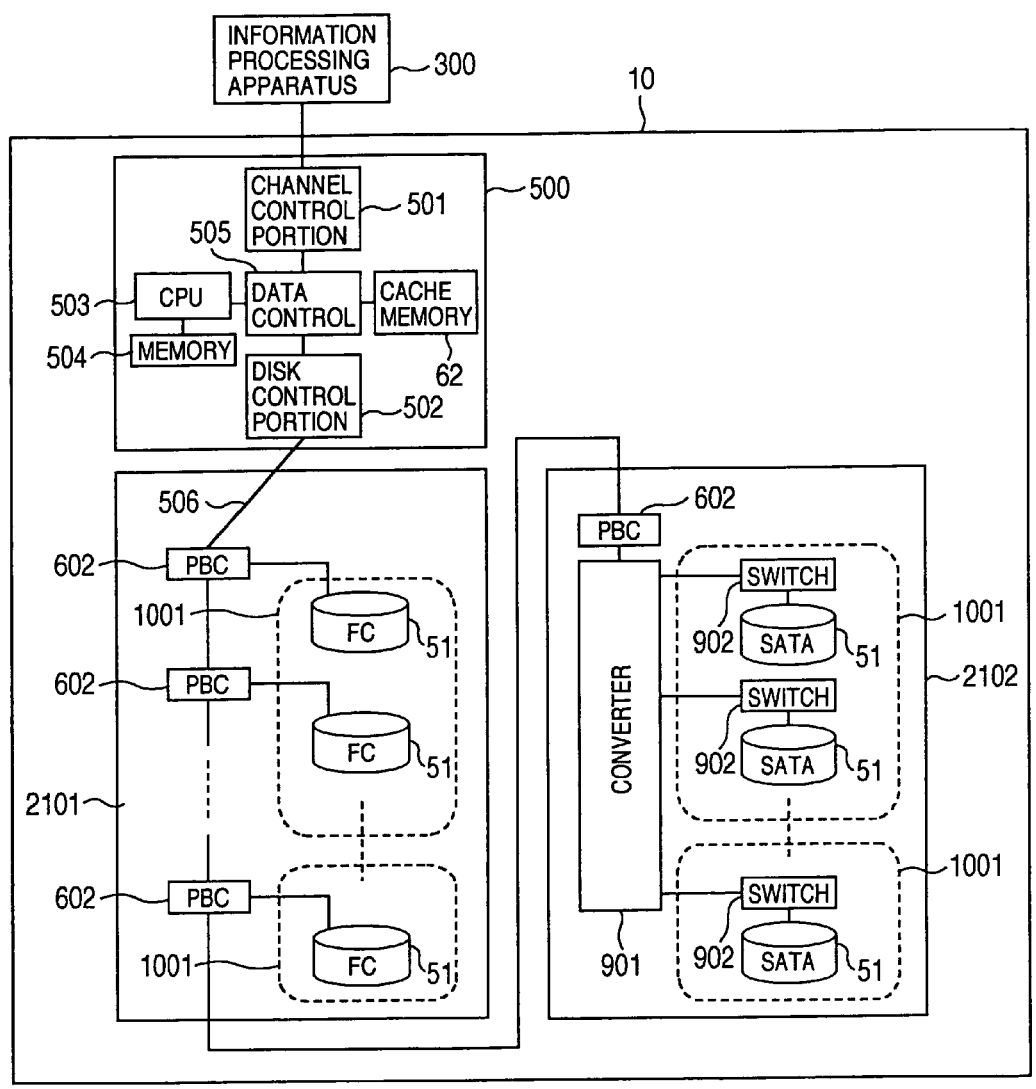
FIG. 21 is a diagram showing the configuration of the disk array system in which fiber channel hard disk drives are stored in a first housing and serial ATA hard disk drives are stored in a second housing according to the embodiment.

FIG. 21 is a block diagram showing a disk array system in which fiber channel hard disk drives 51 are received in a first housing 2101 and serial ATA hard disk drives 51 are received in a second housing 2102. Incidentally, the first and second housings 2101 and 2102 correspond to the master housing 20 and the expansion housing 30 respectively. Each hard disk drive 51 is connected with the disk control portion 502 in the mode described previously. In addition, FIG. 19 shows a mode in which a plurality of serial ATA hard disk drives are connected to one converter 901. However, each serial ATA hard disk drive may be connected through a converter 801 provided for each disk drive unit as described previously.

In the disk array system 10 configured thus, it is requested to enhance the reliability of the serial ATA hard disk drives 51 whose reliability is lower than that of the fiber channel hard disk drives 51. Therefore, the controller 500 applies the aforementioned method for enhancing the reliability only to the serial ATA hard disk drives 51. Thus, the reliability in reading/writing data from/into the serial ATA hard disk drives 51 can be enhanced without lowering the performance in reading/writing data from/into the fiber channel hard disk drives 51 used for processing such as essential work requested to have high access performance. In addition, it is not necessary to change the physical structure, for example, to provide two heads for each magnetic disk of each serial ATA hard disk drive 51. It is therefore possible to suppress the manufacturing cost of the serial ATA hard disk drives 51.

Incidentally, in this embodiment, the fiber channel hard disk drives 51 and the serial ATA hard disk drives 51 are mixed. However, other hard disk drives 51 may be used if they conform to interface standards different in reliability. For example, the serial ATA hard disk drives 51 may be replaced by parallel ATA hard disk drives 51.

The embodiments have been described above in order to make the present invention understood easily. The invention should not be interpreted to be limited to the embodiments. The invention can be changed or modified without departing from its scope and spirit. Any equivalent to the invention is also included therein. In addition, Japanese Patent Application No. 2003-400517 applied in Japan Patent Office on Nov. 28, 2003 is cited to support the present invention and the disclosure of which is incorporated herein by reference.

What is claimed is:

1. A storage system, comprising:
a plurality of controllers controlling to transfer data to a plurality of storage regions;
a plurality of first data lines coupled to said controllers and being used to relay data from said controllers to said storage regions;
a first housing comprising a plurality of first disk drives, said first disk drives comprising some of said plurality of storage regions;
a plurality of circuits, in said first housing, coupled to said first data lines and a plurality of second data lines, said second data lines coupled to a second housing comprising a plurality of second disk drives, said circuits bypassing said first housing and relaying data between said controllers and said second housing if said first housing has a failure;
a plurality of converters, in said first housing, coupled to said circuits by a plurality of third data lines, said converters performing a conversion between a first interface of said controllers and a second interface of at least one of said first disk drives; and
a plurality of switches, in said first housing, each coupled to said converters and at least one of said first disk drives and relaying data via a selected converter of said converters,
wherein said first interface is used to transfer data via said first data lines, said second data lines and/or said third data lines, and
wherein said second interface is located in said first disk drives.

2. A storage system according to claim 1, wherein one of said first data lines is coupled to one of said circuits and another of said first data lines is coupled to another of said circuits,
wherein said one of said circuits is coupled to one of said converters and said another of said circuits is coupled to another of said converters, and
one of said switches is coupled to one of said first disk drives and another of said switches is coupled to another of said first disk drives.

3. A storage system according to claim 1, wherein said first interface is a Fibre Channel (FC) interface, and
wherein said second interface is an AT Attachment (ATA) interface.

4. A storage system according to claim 1, wherein one of said first data lines and one of said second data lines together comprise a Fibre Channel Arbitrated Loop (FC-AL).

5. A storage system according to claim 1, wherein said circuits relay data between said controllers and said first housing, and bypass said second housing to permit transfer of data between said controllers and said first housing if a failure has occurred in said second housing.

6. A storage system according to claim 1, wherein said second interface is an ATA interface, and
wherein each of said second disk drives comprise an FC interface.

7. A storage system according to claim 1, further comprising:
a third housing coupled to said controllers via said circuits and comprising a plurality of third disk drives,
wherein each of said third disk drives comprise an FC interface, and
wherein said second interface is an ATA interface.

8. A storage system according to claim 1, wherein one of said first data lines and one of said second data lines together comprise an FC-AL, and
wherein said second interface is an ATA interface.

9. A storage system according to claim 1, wherein one of said first data lines and one of said second data lines together comprise an FC-AL;
wherein said second interface is an ATA interface,
wherein each of said second disk drives comprises an FC interface,
wherein some of said first disk drives form a Redundant Array of Independent Disks (RAID) group, and
wherein some of said second disk drives form another RAID group.

10. A storage system according to claim 1, wherein said second interface is an ATA interface, and
wherein some of said first disk drives are used to store data, the data are used to back up.

11. A storage system, comprising:
a plurality of controllers controlling to transfer data to a plurality of storage regions;
a plurality of data lines coupled to said controllers and being used to relay data from said controllers to said storage regions;
a first housing having a plurality of first disk drive units, said first disk drive units having a plurality of first disk drives which have some of said storage regions; and
a plurality of circuits each coupled to said data lines and converting a first interface of said controllers and a second interface of at least one of said first disk drives and relaying data sent via a selected data line of said data lines to at least one of said first disk drives,
wherein said first interface is used to transfer data via said data lines, and
wherein said second interface is used in said first disk drive units.

12. A storage system according to claim 11, wherein each of said circuits is in one of said first disk drive units.

13. A storage system according to claim 11, wherein each of said circuits comprises one circuit or a plurality of circuits.

14. A storage system according to claim 11, wherein:
each of said circuits, in said first housing, bypasses one of said data lines.

15. A storage system according to claim 11, wherein one of circuits is coupled to one of said first disk drives and the other of said circuits is coupled to the other of said first disk drives.

16. A storage system according to claim 11, wherein said first interface is a fibre channel (FC) interface, and
wherein said second interface is an AT Attachment (ATA) interface.

17. A storage system according to claim 11, wherein one of said data lines is a Fibre Channel Arbitrated Loop (FC-AL).

18. A storage system according to claim 11,
wherein each of said circuits comprise a plurality of bypass circuits and a plurality of converter circuits converting said first interface and said second interface, and
wherein one of said bypass circuits bypasses one of said converters to permit transfer of data between said controllers and the other of said converters if a failure has occurred in said one of said converters.

19. A storage system according to claim 11, further comprising:
a second housing comprising a plurality of second disk drive units, which comprise a plurality of second disk drives and couple to said data lines,
wherein said second interface is an ATA interface, and wherein each of said second disk drive units have FC interface.

20. A storage system according to claim 11, further comprising:
   a second housing coupled to said data lines between said controllers and said first housing and comprising a plurality of second disk drive units, which comprise a plurality of second disk drives,
   wherein each of said second disk drive units comprise and FC interface, and
   wherein said second interface is an ATA interface.

21. A storage system according to claim 11, wherein one of said data lines is an FC-AL, and
   wherein said second interface is a ATA interface.

22. A storage system according to claim 11, further comprising:
   a second housing coupled to said data lines between said controllers and said first housing and comprising a plurality of second disk drive units, which comprise a plurality of second disk drives,
   wherein one of said data lines is an FC-AL,
   wherein said second interface is an ATA interface,
   wherein some of said first disk drives form a Redundant Array of Independent Disks (RAID) group, and
   wherein some of said second disk drives form another RAID group.

23. A storage system according to claim 11, wherein said second interface is an ATA interface, and
   wherein some of said first disk drives are used to store data, the data are used to back up.

* * * * *